(12) United States Patent
Baker

(10) Patent No.: US 11,091,221 B1
(45) Date of Patent: Aug. 17, 2021

(54) PEDAL SLIDER ASSEMBLY

(71) Applicant: Scott Baker, Sherman Oaks, CA (US)

(72) Inventor: Scott Baker, Sherman Oaks, CA (US)

( * ) Notice: Subject to any disclaimer, the term of this patent is extended or adjusted under 35 U.S.C. 154(b) by 0 days.

(21) Appl. No.: 17/185,961

(22) Filed: Feb. 26, 2021

Related U.S. Application Data

(63) Continuation-in-part of application No. 16/517,638, filed on Jul. 21, 2019, now abandoned.

(51) Int. Cl.
| | |
|---|---|
| *B62M 3/02* | (2006.01) |
| *B62M 3/08* | (2006.01) |
| *A63B 21/00* | (2006.01) |
| *A63B 21/012* | (2006.01) |
| *A63B 22/06* | (2006.01) |

(52) U.S. Cl.
CPC ......... *B62M 3/08* (2013.01); *A63B 21/00069* (2013.01); *A63B 21/012* (2013.01); *A63B 21/4034* (2015.10); *A63B 21/4045* (2015.10); *A63B 22/06* (2013.01)

(58) Field of Classification Search
CPC ........ B62M 3/08; B62M 3/083; B62M 3/086; B62M 3/16
See application file for complete search history.

(56) References Cited

U.S. PATENT DOCUMENTS

| | | | | | |
|---|---|---|---|---|---|
| 4,338,829 | A * | 7/1982 | Ozaki | ...................... | B62M 3/08 74/560 |
| 6,640,662 | B1 * | 11/2003 | Baxter | ..................... | B62M 3/04 280/259 |
| 9,145,187 | B2 * | 9/2015 | Kelley | ...................... | B62M 3/16 |
| 2003/0205103 | A1 * | 11/2003 | Vaughn | .................. | B62K 15/00 74/594.1 |
| 2014/0259705 | A1 * | 9/2014 | Stevovich | ................ | B62M 3/08 33/1 N |

FOREIGN PATENT DOCUMENTS

| | | | | |
|---|---|---|---|---|
| EP | 2674353 A1 * | 12/2013 | ............. | B62M 3/08 |
| FR | 2661651 A1 * | 11/1991 | ............. | B62M 3/08 |
| WO | WO-2017018884 A1 * | 2/2017 | ............. | B62M 3/08 |

OTHER PUBLICATIONS

Machine Translation of FR 2,661,561, obtained Oct. 15, 2019.*
Machine Translation of EP 2,674,353, obtained Oct. 15, 2019.*

* cited by examiner

*Primary Examiner* — Richard W Ridley
*Assistant Examiner* — Brian J McGovern

(57) ABSTRACT

A pedal slider assembly that allows for a normal pedal affixed to a normal bicycle to slide laterally outwardly away from the bicycle frame and back inwardly towards the bicycle frame allowing the rider to find their bodies natural pedal placement as it travels through the rotational pedaling path based on their specific skeletal structure restrictions, (those being the width of an individual's hips, knees, and ankles) as those positions dictate the center line of the user and as those positions are directly affected by the pedal relationship to the center line of the bicycle frame, additionally there is a multitude of lateral movement length options for the rider to utilize to garner specific exercise benefits.

4 Claims, 36 Drawing Sheets

PEDAL SLIDER ASSEMBLY

CROSS-REFERENCE TO RELATED APPLICATION

This application claims the benefit of U.S. Provisional Patent Application No. 62/784,663 filed Dec. 24, 2018, and the benefit of U.S. Non Provisional patent application Ser. No. 16/517,638 filed Jul. 21, 2019 contents of which are incorporated herein by reference in their entirety.

BACKGROUND AND FIELD OF INVENTION

Ever since the days of Leonardo Da Vinci when he first drew what is today identified as a bicycle it has evolved and evolved. While Leo's drawing had no pedals and thus no brakes it certainly was the seed of cycling today.

The majority of the evolutionary steps have been centered around improving fitment and adjustability to the user. Everything from different frame sizing, different crank arm sizing, different seat post lengths, different wheel diameters, different tire thicknesses and purposes, different applications of bikes from road bikes to mountain bikes which individually spurred advancements in aerodynamics and suspension components. Pedals themselves have evolved as well allowing for better and more functional ways of securing the riders footwear to the pedal itself in an effort to generate more energy and utilize that energy in the most efficient and effective way possible. With all these improvements over decades making the relationship between the rider and bike more ergonomic, more symbiotic, and more natural in their relationship. What has not been addressed is the ankle, knee, and hip joints of the rider in relation to the fixed and rigid distance from the center line of the bicycle to the pedal.

It has been assumed that the rotational path, or "circle" created when pedaling as it relates to the distance between the center line of the bike and the center of the pedal, that that distance/width is the correct distance/width for the rider's skeletal structure from the center of the rider's hip/cradle to the hip socket.

The assumption is two-fold, the first being that the aforementioned calculation is correct and the second assumption being that every single rider has the exact same skeletal structure. Both assumptions are incorrect forcing the rider into the rigid pedal structure the "circle" holds them in with the current pedal to frame configurations, the hip knee and ankle joints of the body forced to make the internal adjustments to compensate for the width differences between the pedal to center of frame distance and the hip socket to center of hip cradle distance. A pedal free to "float" will allow the natural path to occur as human joints are not machined and do not hold a consistent path through a circular motion, the pedal if free to float laterally while in rotation will move in and out different distances at different points in the rotation of the pedaling motion, just as viewing someone walking from behind them, the feet move laterally outward and inward different amounts at different points throughout the walking motion as dictated by the individual's skeletal structure.

Therefore, a need has long existed for a pedal or pedal system that can accommodate the different skeletal structures of bicycle riders free of any pre-established rigid distance/width between the pedal and the center of the bike throughout the rotational pedaling path.

SUMMARY OF INVENTION

The invention currently defined is a bicycle pedal slider assembly that allows for each individual rider to create a pedaling rotational path (circle) that best accommodates the rider's own skeletal structure requirements by allowing the pedals to move outwardly and then back inwardly in a lateral manner from the center of the bicycle frame itself during the rotational pedaling function in a free and unrestricted manner. The pedal resides on a structure that attaches to the bicycle crank arm in the standard mounting location of a pedal allowing the pedal a floating range of outward and inward lateral movement through any part of the rotational pedal path as the joint configuration of the rider dictates is correct for smooth non joint binding rotational movement. The floating ability allows for symmetry between the width of the pedals from one to the other in relation to the center of the bicycle frame and the width of the hip sockets of the rider in relation to the spine, this symmetry relieving all binding joint issues that occur with rigid mounted pedals as the current invention allows the pedals to freely follow the foot which follows the ankle which follows the knee which follows the hip socket joint, essentially allowing the pedals to follow the body instead of the body following the pedals.

Additionally, the current invention offers a multitude of selectable travel length grooves allowing a rider to configure a specific range of lateral mobility the pedal can freely laterally float within, as well the ability to lock the pedal at the farthest laterally outward location the selected travel length groove offers.

The lateral floating option while pedaling in the rotational pattern incorporates additional muscles in the legs generating greater power while maximizing efficiency and effectiveness.

Furthermore, the rider can change the desired travel length groove by simply turning a knob at the outer most edge of the pedal slider assembly structure, and can lock or unlock the lateral movement option by pushing in or pulling out the same knob.

DETAILED DESCRIPTION OF THE DRAWINGS

Figure 1:
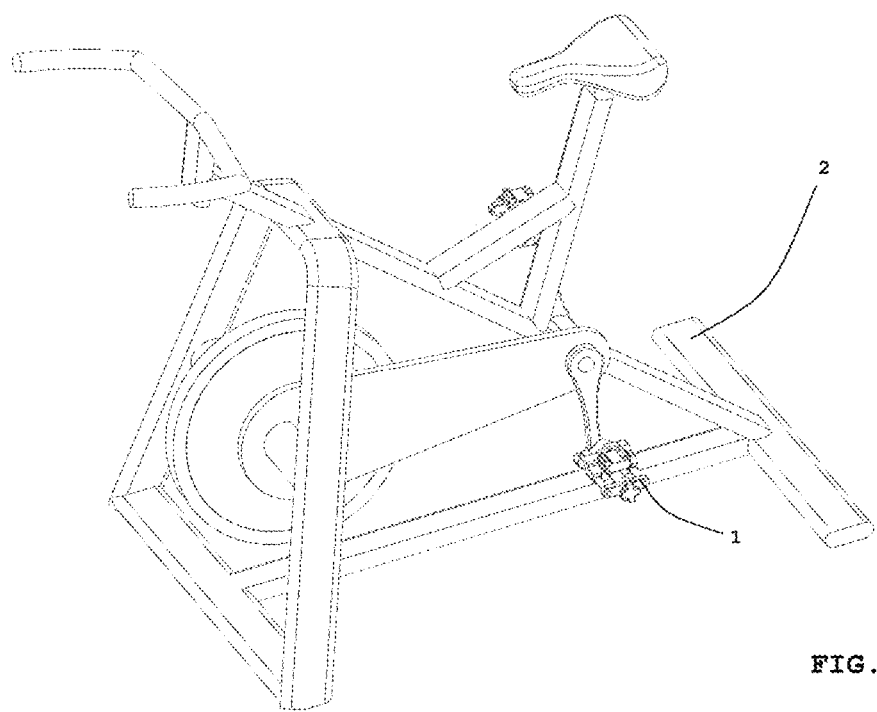
FIG. 1 Discloses a stationary type of bicycle with the current invention attached and a standard pedal attached to the current invention.

FIG. 1 With reference to FIG. 1 a stationary bike 2 is shown with a pedal slider assembly 1 attached to a standard crank arm with a standard pedal attached to the current invention.

Figure 2:
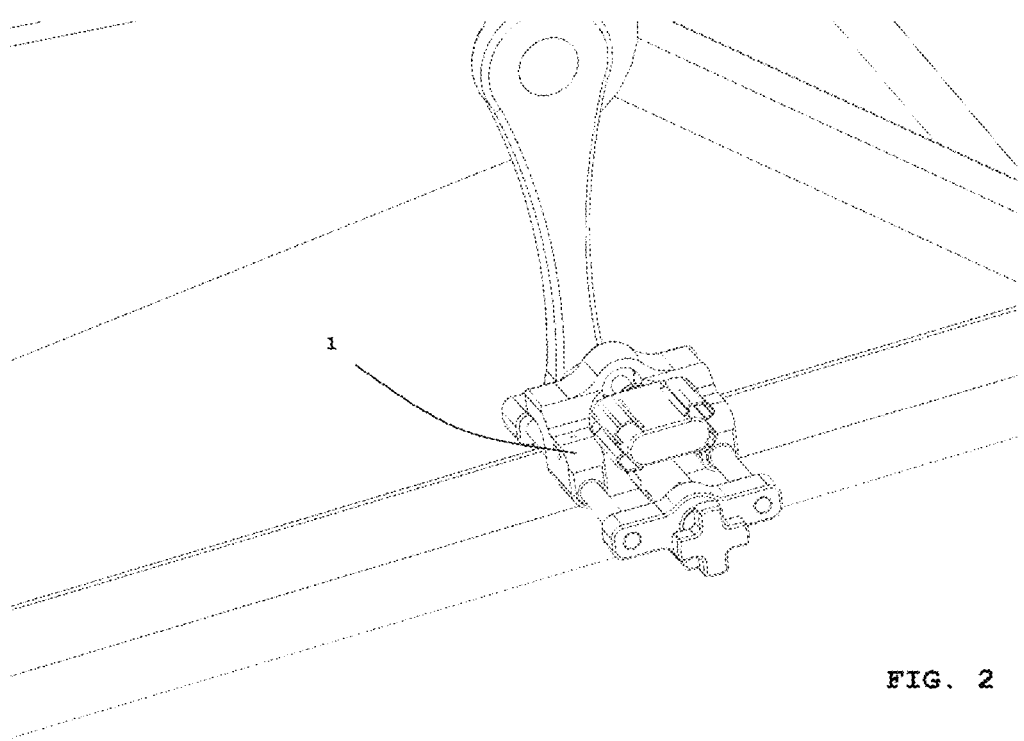
FIG. 2 Shows a close up view of the current invention attached to a stationary bicycle and a standard pedal attached to the current invention.

FIG. 2 Shows a close-up view of the pedal slider assembly 1 with a standard pedal attached.

Figure 3:
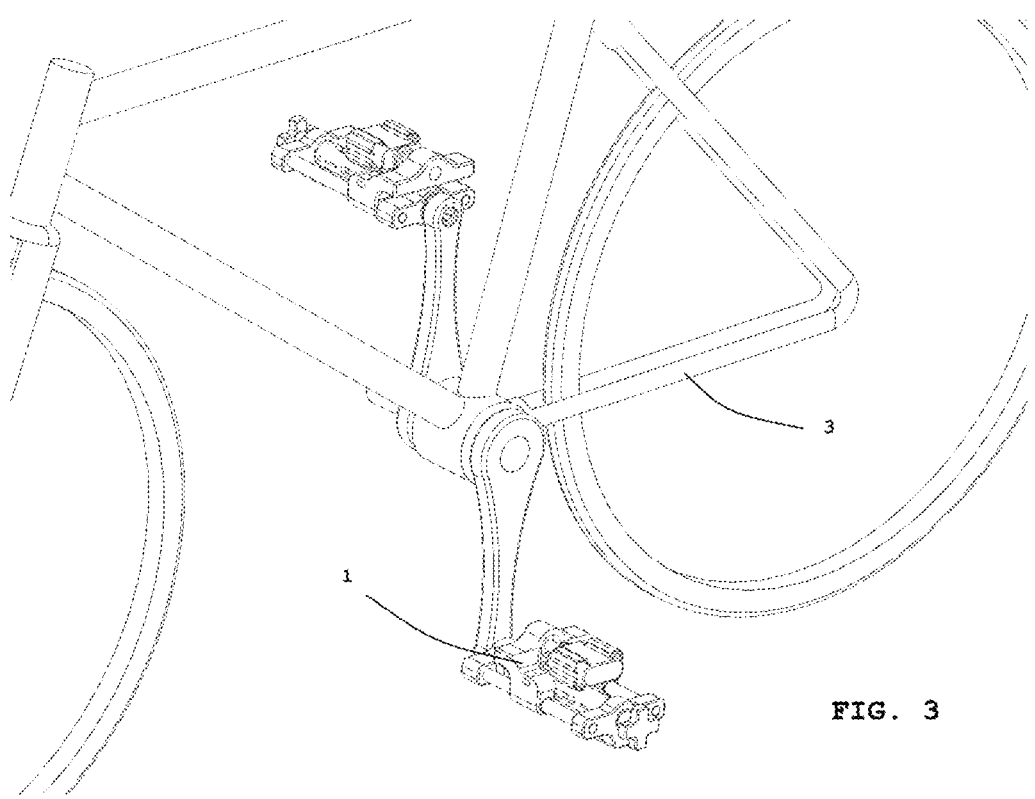
FIG. 3 Discloses the current invention attached to a standard road type bicycle and a standard pedal attached to the current invention.

FIG. 3 Showing the current invention, the pedal slider assembly 1 with a standard pedal attached being utilized on a generic road type bicycle 3.

Figure 4:
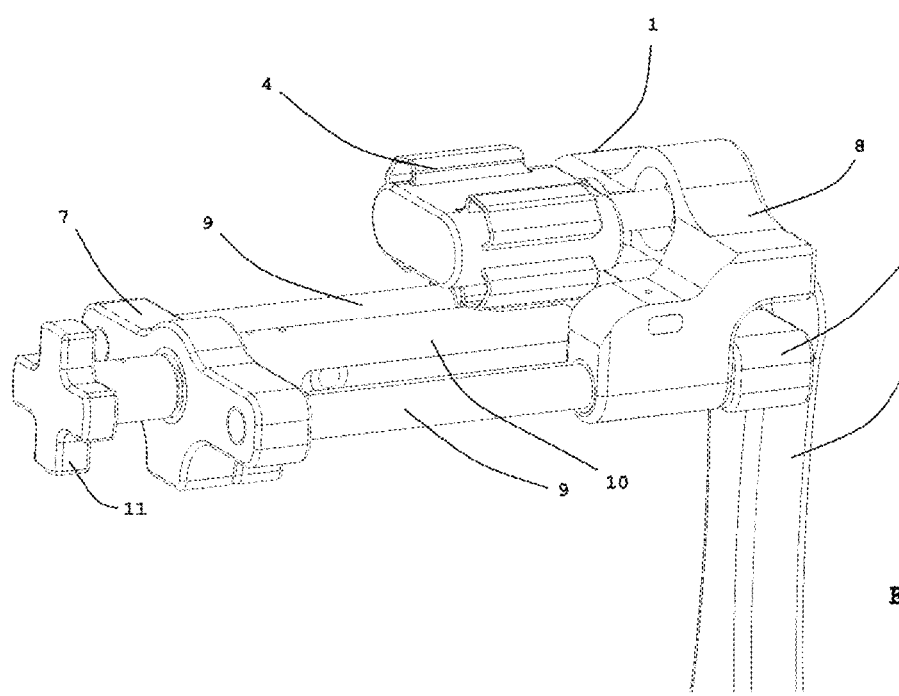
FIG. 4 Shows a close up view of the current invention with a standard pedal attached.

FIG. 4 Details an angled side view of the pedal slider assembly a standard "clip in" type pedal 4 available at any bike store is attached. The pedal slider assembly 1 is attached to a standard bicycle crank arm 5 found on every bicycle made. A bearing housing end cap 6 is at one end of the slider base structure while a slider end cap 7 is at the other end, the two end caps connected by a pair of slider rods 9. A pedal slider 8 slides across the slider rods 9 and the length of slide, or "travel" is determined by differing length grooves in a travel length bar 10, the choice of travel groove determined by a selector handle 11.

Figure 5:
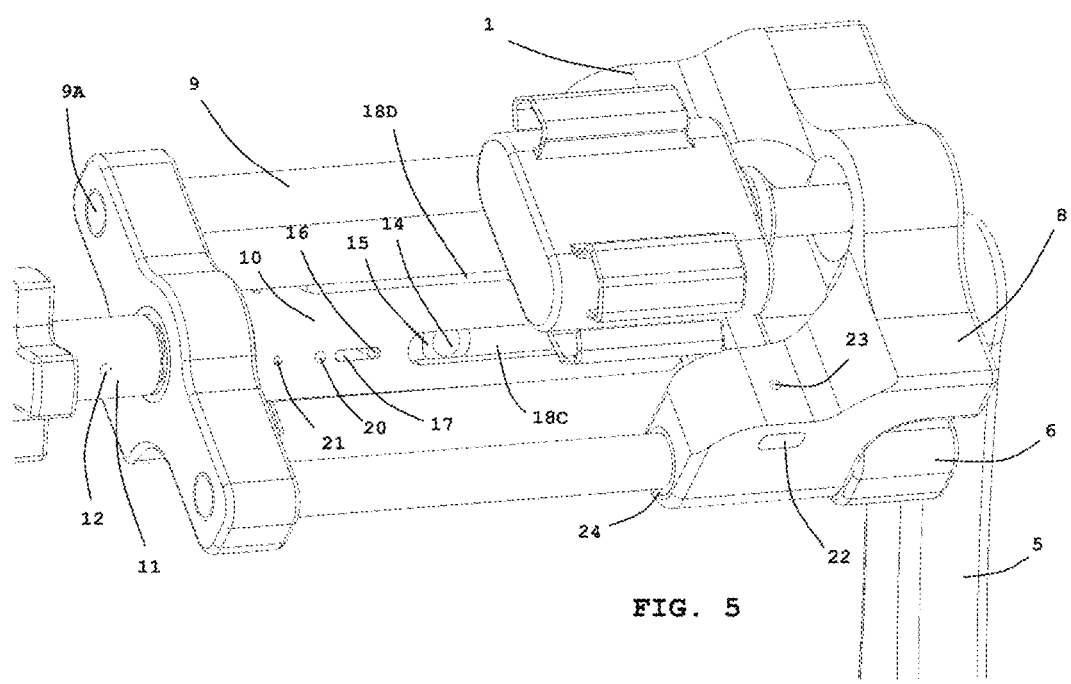
FIG. 5 Shows a close up view of the current invention at a moderately clockwise rotated angle with a standard pedal attached to the current invention.

FIG. 5 Shows the pedal slider assembly 1 as shown in FIG. 4 and rotated slightly clockwise demonstrating that the entire assembly moves as any standard bicycle pedal does when attached to a standard bicycle crank arm. The pedal slider 8 which houses a travel post bar 22 which is held in place by a plurality of pins 22. The pedal slider 8 has a plurality of slider bushings 24 in its lower section allowing the pedal slider to glide smoothly across the slider rods 9. The length of travel dictated by one of a multitude of different travel length grooves (18C and 18D shown) featured in the travel length bar 10. Travel length groove options are chosen by the user selecting one of the available positions by turning the selector handle 11 which is connected to the travel length bar 10 by a retaining pin 12.

Additionally, there is a singular travel slot 17 featured in the travel length bar 10 which limits an internal lock bar (not shown) travel by limiting the movement of a travel pin 16 inside the travel slot 17, stopping the user from pulling or pushing the selector handle 11, and by connection the internal lock bar beyond the range of its functional intent. A standard pedal 4 is attached to the pedal slider assembly.

Figure 6:
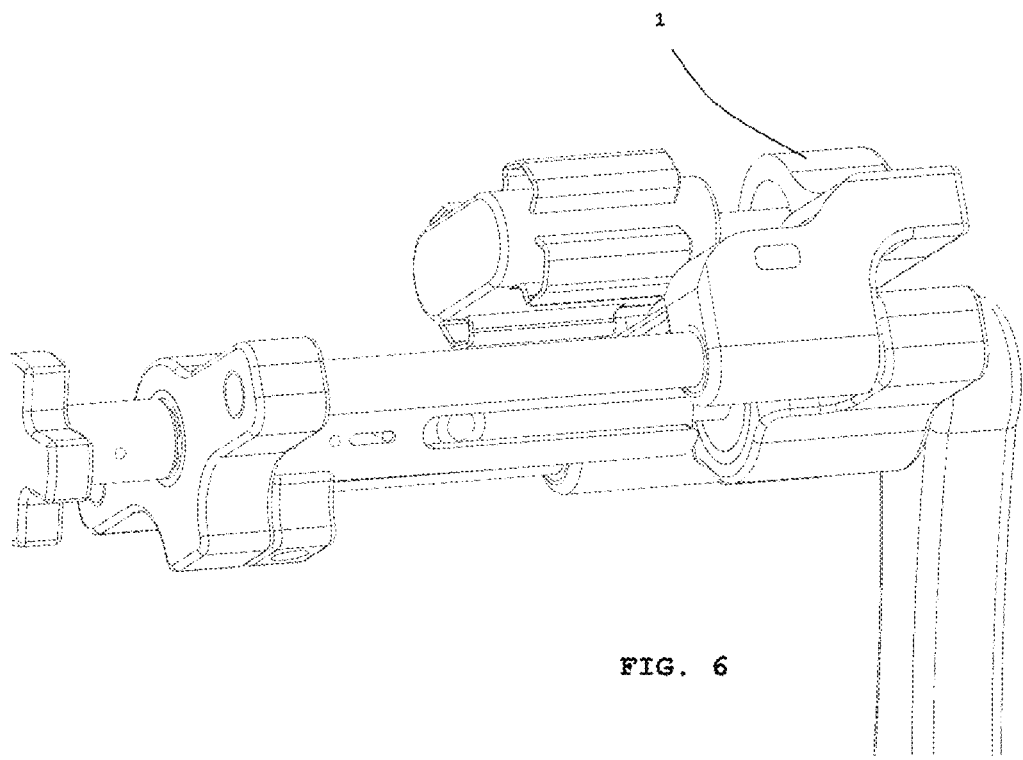
FIG. 6 Shows a close up view of the current invention at a moderately counter-clockwise rotated angle with a standard pedal attached to the current invention.

FIG. 6 Showing the pedal slider assembly 1 with a standard pedal attached in a slightly counter-clockwise rotation indicating its ability to move much like a standard pedal when attached directly to a standard crank arm. A standard pedal is attached to the pedal slider assembly.

Figure 7:
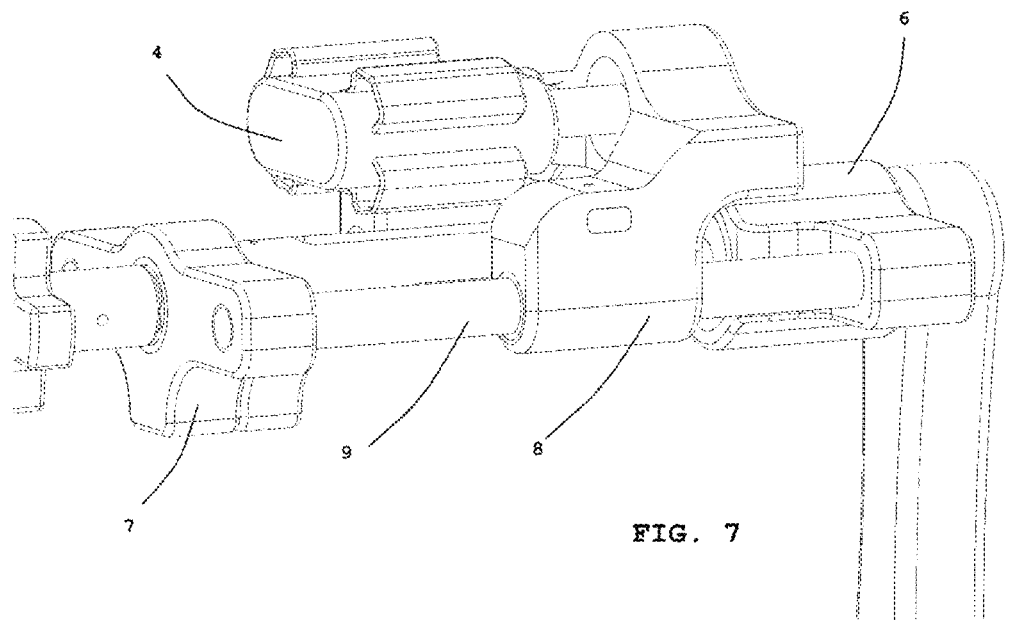
FIG. 7 Discloses the current invention in one of the laterally outwardly positions the current invention affords the pedal to move outwardly of the industry standard position for all bicycle pedals and a standard pedal attached to the current invention.

FIG. 7 Shows the pedal slider assembly with the pedal slider 8 moved laterally outward away from the bearing housing end cap 6 towards the slider end cap 7 along the slider bars 9. A standard pedal 4 is attached to the pedal slider assembly.

Figure 8:
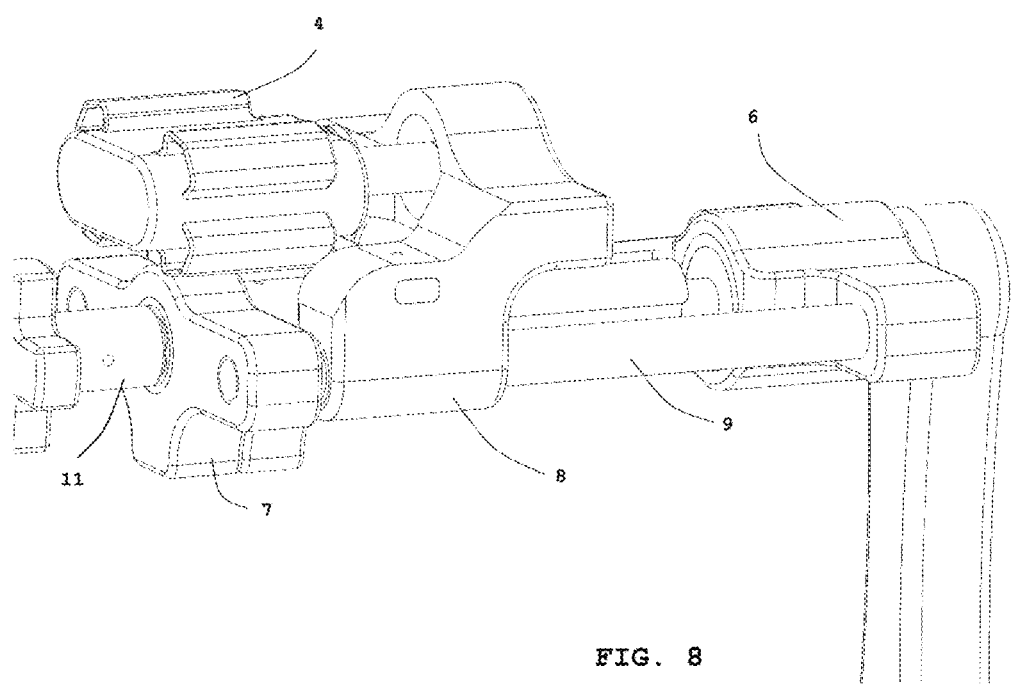
FIG. 8 Discloses the current invention in one of the laterally outwardly positions the current invention affords the pedal to move even further outwardly of the industry standard position for all bicycle pedals and a standard pedal attached to the current invention.

FIG. 8 Shows the pedal slider assembly with the pedal slider 8 in a position laterally outward farther than indicated in FIG. 7. A standard pedal 4 is attached to the pedal slider assembly.

Figure 9:
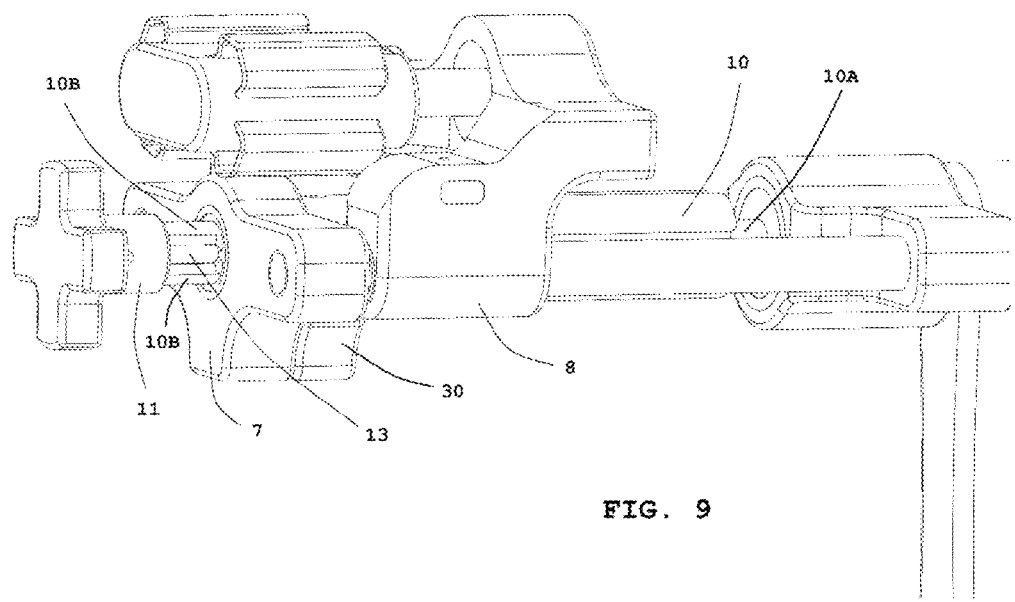
FIG. 9 Shows the current inventions selector handle ability to slide outwardly away from the main end structure which unlocks the current inventions ability to move further and further outwardly in a lateral manner and a standard pedal attached to the current invention.

FIG. 9 Shows the pedal slider assembly with the pedal slider 8 in the same outward position as in FIG. 8. The selector handle 11 is featured in a position having been pulled away from the slider end cap 7. A lock shaft 13 is shown between a pair of alignment arms 10B located at the outward most end of the travel length bar 10, the lock shaft resides in a center opening of the travel length bar 10. The outward position of the selector handle 11, away from the slider end cap 7, allows the lock shaft 13 to unlock the locking system. With the selector handle 11 pulled to its outward most position away from the slider end cap 7 the user is free to slide the pedal slider 8 back and forth across the length of one of the chosen travel groove 18A, 18B, 18C, or 18D. When the selector handle 11 is pushed inward towards the slider end cap 7 it locks the pedal slider in place stopping the user from moving the pedal slider 8 back and forth across the entire available travel length by restricting the pedal slider 8 travel to the farthest laterally outward position of one of the chosen travel groove 18A, 18B, 18C, or 18D.

Figure 10:
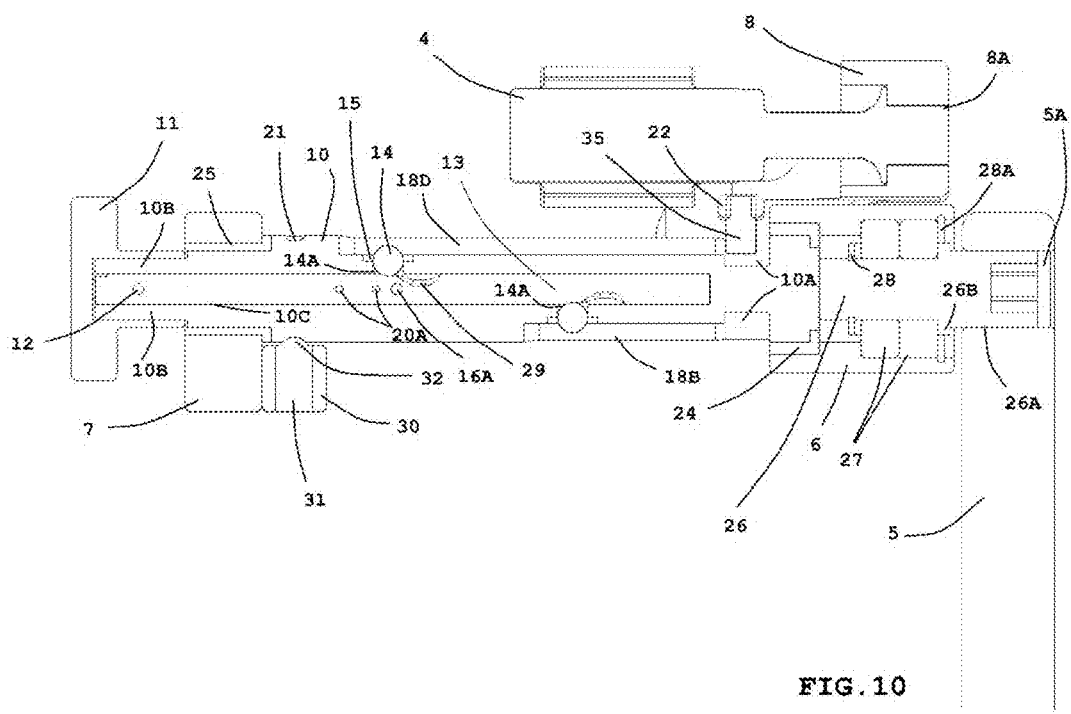
FIG. 10 Shown in cut away view from the side is the current invention and a standard pedal attached to the current invention.

FIG. 10 Shown in cut away side view, an assembly mounting post 26 with threads 26A releasably engaged in a threaded receiver 5A in a standard crank arm 5. The assembly mounting post 26 supporting a pair of bearings 27 which are secured in position by a flange 26B and a retaining clip 28. The assembly post 26 is held in position inside the bearing housing end cap 6 by a retaining ring 28A. The selector handle 11 is secured to the lock shaft 13 by the lock pin 12, the lock pin 12 passing between the travel length bar arms 10B. The travel length bar 10 being held in position between the bearing housing end cap 6 and the slider end cap 7 and rotatable against a bushing 24 secured in the bearing housing end cap 6 and a bushing 25 secured in the slider end cap 7. The travel length bar 10 having a neutral positioning groove 10A around the entire circumference, a multitude of detent ball alignment indentations 21 positioned around the circumference, and a multitude of travel length grooves also spaced around the circumference. (18A-18D, 18D and 18B shown). The travel length grooves 18A-18D each have a through hole 14A to an internal opening 10C, the internal opening 10 extends for most of the length of the travel length bar 10 and houses the lock shaft 13. The hole 14A confines and directs a lock ball 14 to a vertical path that is limited at the height of its vertical range by a lock ball retainer 15 which is inset into the floor 18D1 of the travel groove 18D (in this example) the vertical movement of the lock ball being directed by the movement of the lock shaft 13. The lock shaft 13 having a lock ball ramp 29 for each travel groove 18A-18D in the travel length bar 10 as well as a plurality of indentations 20A which allow a detent ball (not shown) to give a haptic response to the user that the lock shaft 13 is at either end of its travel limit. Additionally, a hole 16A for securing a travel limiting pin 16 (not shown) as it moves within the travel limiting slot (not shown). Attached to the slider end cap 7 is a detent ball housing 30 which secures a detent ball assembly 31 which incorporates a detent ball 32, the detent ball 32 releasably engages the indentations 21 which gives the user a haptic response when one of the travel grooves 18A-18D is in correct position to allow the pedal slider 8 to be used.

Figure 11:
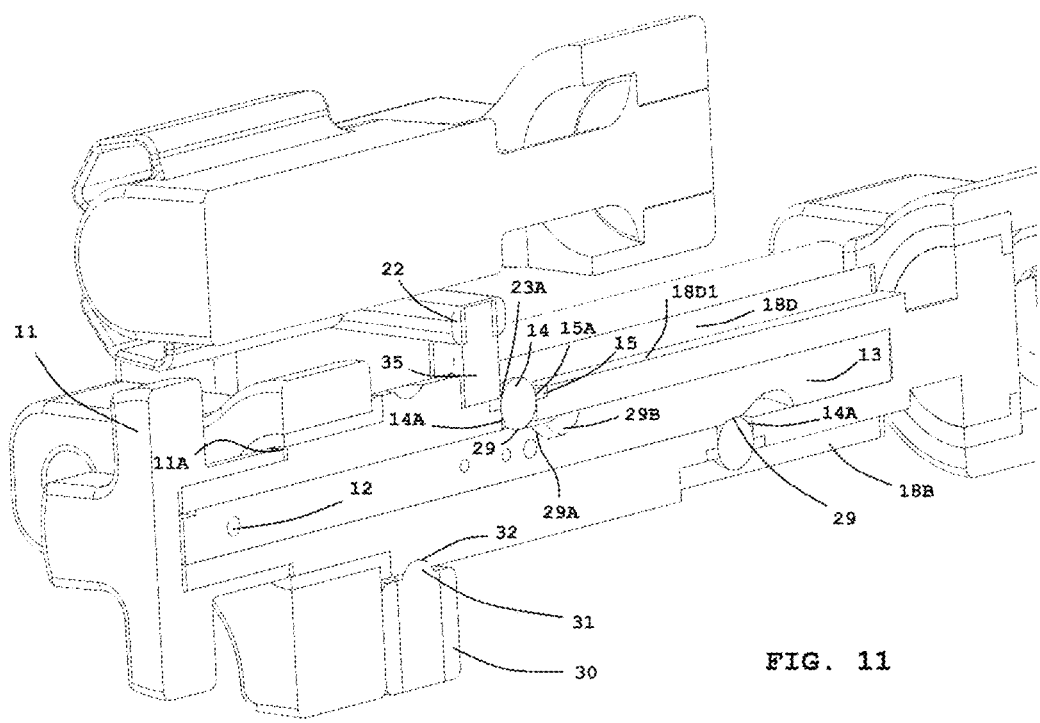
FIG. 11 Shown in cut away ¾ view focused on the internal locking unlocking system of the current invention and a standard pedal attached to the current invention.

FIG. 11 Shown in cut away ¾ view detailing the selector handle 11 at a contact point 11A with the travel length bar 10 which establishes the locked position for the pedal slider 8. The travel post bar 22 which is secured within the pedal slider 8 holds a travel post 35. The travel post 35 is shown between the lock ball 14 and the end of the travel groove 18D, the lock ball 14 being in its most elevated position which facilitates a large portion of the lock ball 14 being above the floor 18D1 of the travel groove 18D and contained within the lock ball hole 14A pressed up against a lock ball retainer 15 at a contact point 15A which is on the top side of the lock ball 14 and lifted into the current position by a locked position 29 which is one of the three positions on the lock shaft, those three being an unlocked position, a transitional ramp position, and a locked position, the lock ball 14 blocking the travel post 35 at an interference point 23A which blocks the entire pedal slider 8 from lateral movement, thus directing the user to pedal in a path that is a set distance away from the centerline of the bicycle.

Figure 12:
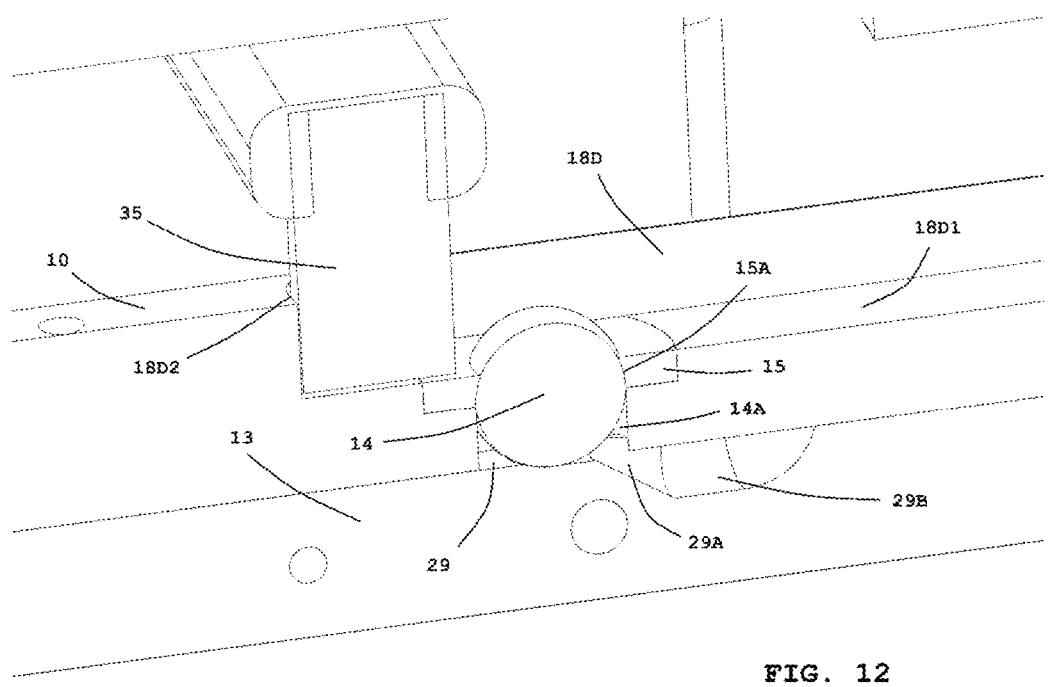
FIG. 12 Shown in cut away view a detailed view of the locking system.

FIG. 12 Shown in cut away view and up-close detail of the lock ball system wherein the lock ball 14 moves up and down in within the lock ball hole 14A situated within the floor 18D1 of travel groove 18D of the travel length bar 10 (in this example). Lock ball retainer 15 stops the vertical travel of the lock ball 14 at contact point 15A allowing the lock ball 14 to sit partially in the path of the travel post 35 keeping the travel post 35 trapped between the end of the travel groove 18D2 and the lock ball 14. The lock ball movement generated by the directional movement of the lock shaft 13 which is moved by pulling out or pushing in the handle 11. Within the lock shaft 13 is the lock unlock ramp which has three positions, the lock position 29 which holds the lock ball up through the travel groove floor as described above, a transitional ramp position 29A which allows the lock ball 14 to ascend through the floor as previously described or descend deeper into the lock ball hole 14A, and an unlock position 29B which holds the lock ball 14 below the floor of the travel grove 18D1 which then allows the travel post 35 to move freely back and forth the distance of the travel grove 18D when the pedal slider 8 is moved by the user by their foot attached to the pedal.

Figure 13:
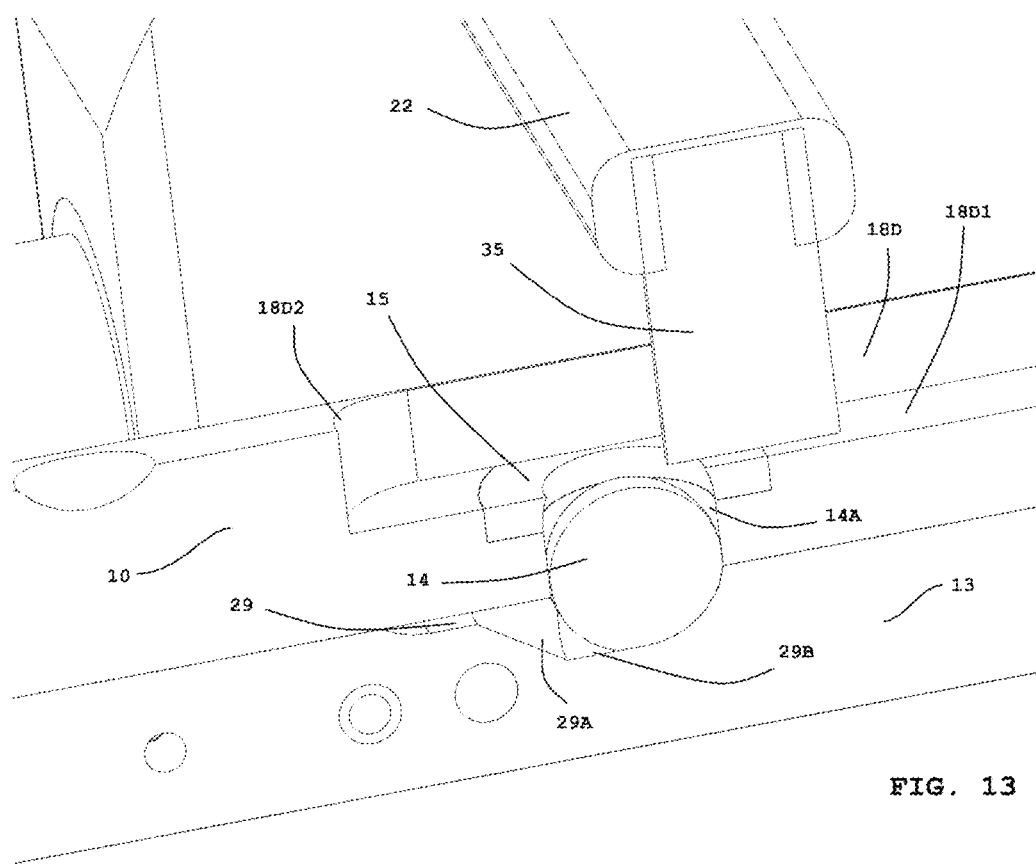
FIG. 13 Discloses the lock bar and lock ball.

FIG. 13 Details all the same components as FIG. 12 although shown here is the lock shaft 13 having been pulled outward by handle 11 (not shown) moving the position of the lock system from the lock ramp 29 position as it relates to the lock ball 14 to lock ramp 29B position which allows the lock ball 14 to descend into lock hole 14A causing the lock ball 14 to drop below the floor 18D1 of travel groove 18D allowing travel post 35 to travel across the lock ball hole and freely the entire length of the travel groove 18D as the user may desire.

Figure 14:
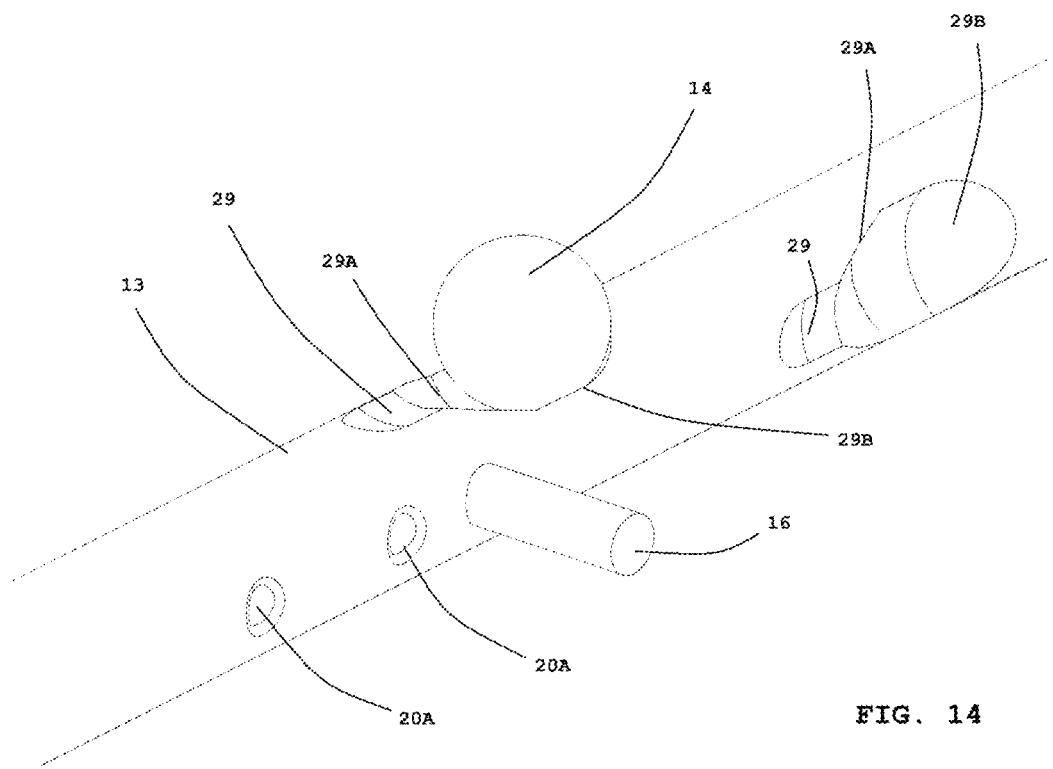
FIG. 14 Discloses the travel limiter structure for the lateral outwardly travel abilities of the current invention.

FIG. 14 Details the lock shaft 13 with the lock ball 14 seated in the unlocked position 29B of the lock unlock ramp. The locked position of the ramp 29 and the transitional position of the ramp 29A are also shown as well as a second ramp, the lock shaft having as many lock/unlock ramps as the travel length bar 10 has travel length grooves (18A-D in this example). Additionally, the lock shaft 13 details the travel limitation pin 16 which resides in the travel limit slot 17 (not shown) which limits the user from pulling the selector handle 11 beyond the ramp systems function. Indentations 20A accept the detent ball that resides in the travel length bar 10 which gives the user haptic feedback at each end of the lock shaft's movement limitations.

Figure 15:
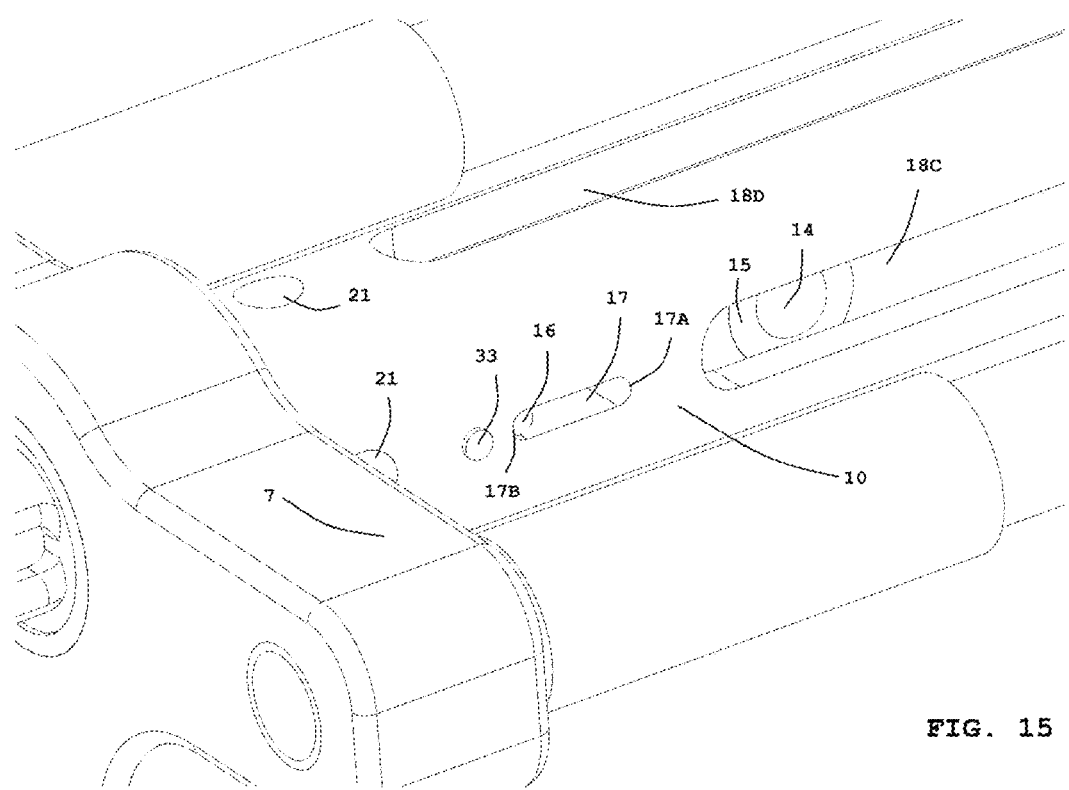
FIG. 15 Shown in transparent view is the travel limiting system.

FIG. 15 Shown in ¾ front up close view, the travel length bar 10 with travel grooves 18D and 18C showing, the lock ball 14 and lock ball retainer 15 secured in travel groove 18C, travel limiting pin 16 inside travel limitation slot 17, the limitation slot 17 having an unlocked position end and a locked position end, the limiting pin 16 at the unlocked position end 17B of the slot 17, the locked position end being 17A, the travel limiting pin 16 being inserted into the lock shaft 13 (not shown see FIG. 14). Lock shaft 13 detent ball assembly 33 is present to give haptic feedback to users when pulling the handle 11 from the locked position of the lock shaft to the unlocked position as the lock shaft detent ball assembly 33 falls into lock shaft indentations 20A (not shown, see FIG. 14)

Figure 16:
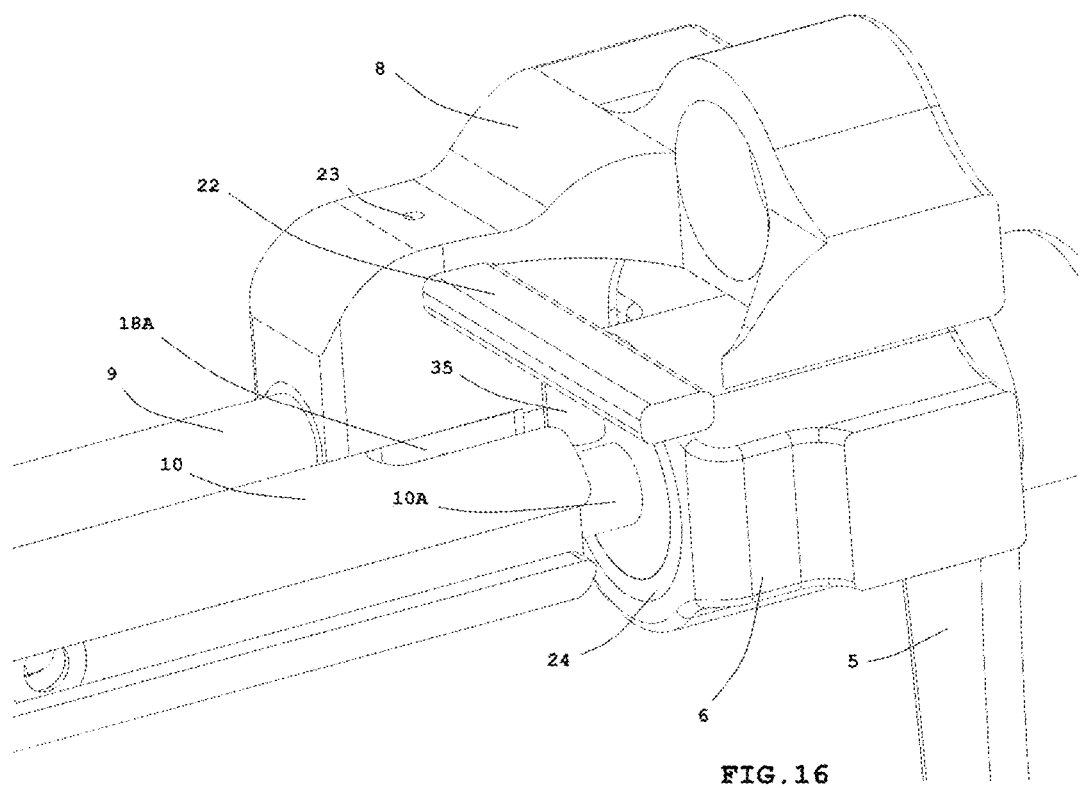
FIG. 16 Shown in cut away view, the lateral travel slots are disclosed with travel pin in the neutral position.

FIG. 16 Shown in cut away view, the bearing housing end cap 6 attached to the standard crank arm 5, the pedal slider 8 riding on the slider rod 9, the travel length rod 10 secured at one end in the bearing housing end cap 6, showing the travel post 35 in the neutral position groove 10A. When the travel post 35 is in groove 10A the user can turn the selector handle 11 (not shown) which rotates the travel length bar 10 allowing the user to choose one of several travel length grooves ex: 18A shown, the length of the groove (18A) determines the amount of outward lateral travel the pedal slider 8 and pedal can traverse.

Figure 17:
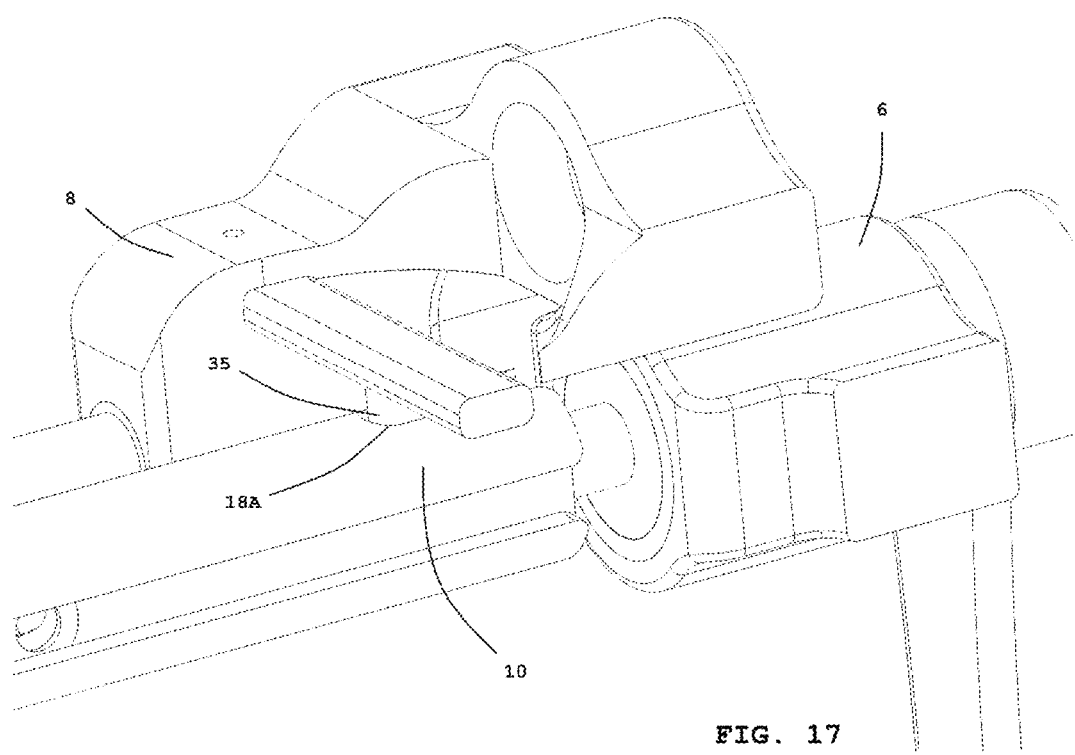
FIG. 17 Shown in cut away view, the lateral travel slots are disclosed with travel pin in the furthest position of the shortest of four lateral travel slots.

FIG. 17 Shown in cut away view just as in FIG. 16 although now showing the pedal slider 8 having moved outward laterally to the end of the chosen travel length groove ex: 18A, travel post 35 shown at the end of travel length groove 18A.

Figure 18:
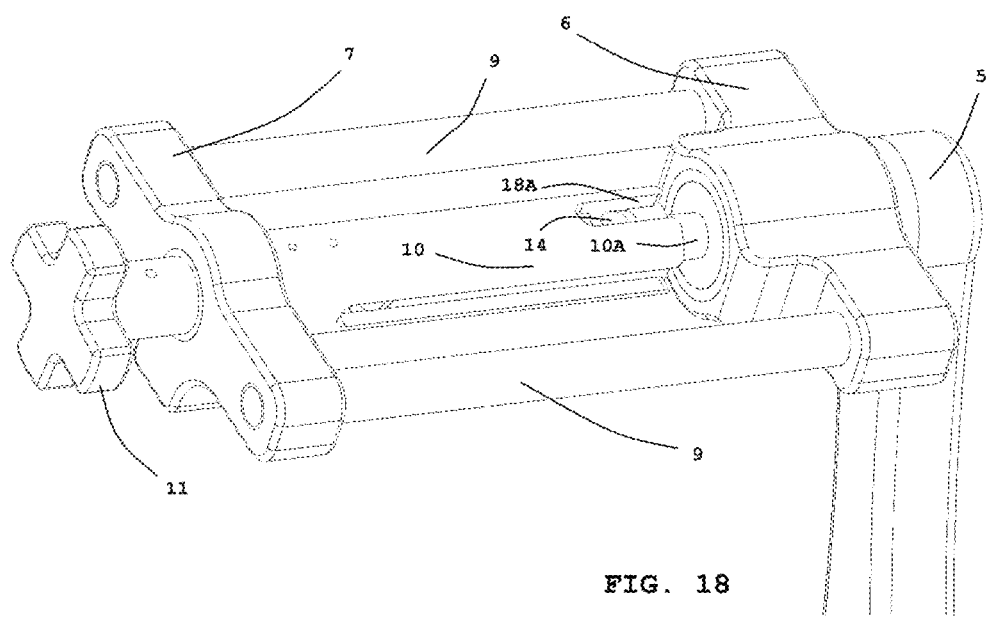
FIG. 18 Discloses the current invention without the pedal slider, detailing different travel slots and the neutral position, as well as the slider bars in which the pedal slider travels laterally across to achieve different lengths of lateral travel ability.

FIG. 18 Describes a top view at a moderate clockwise rotation with the pedal slider 8 absent for a clear view of the neutral position groove 10A which is cut into travel length bar 10. The bearing housing end cap 6 and the slider end cap 7 connected by the pair of slider rods 9 exhibit the rotational structure of the current invention upon which the pedal slider 8 traverses outwardly and inwardly (away from the bearing housing end cap 6 and towards the slider end cap 7 and then the reverse of that motion) while holding a standard pedal. Also shown in travel length grove 18A is the locking system.

Figure 19:
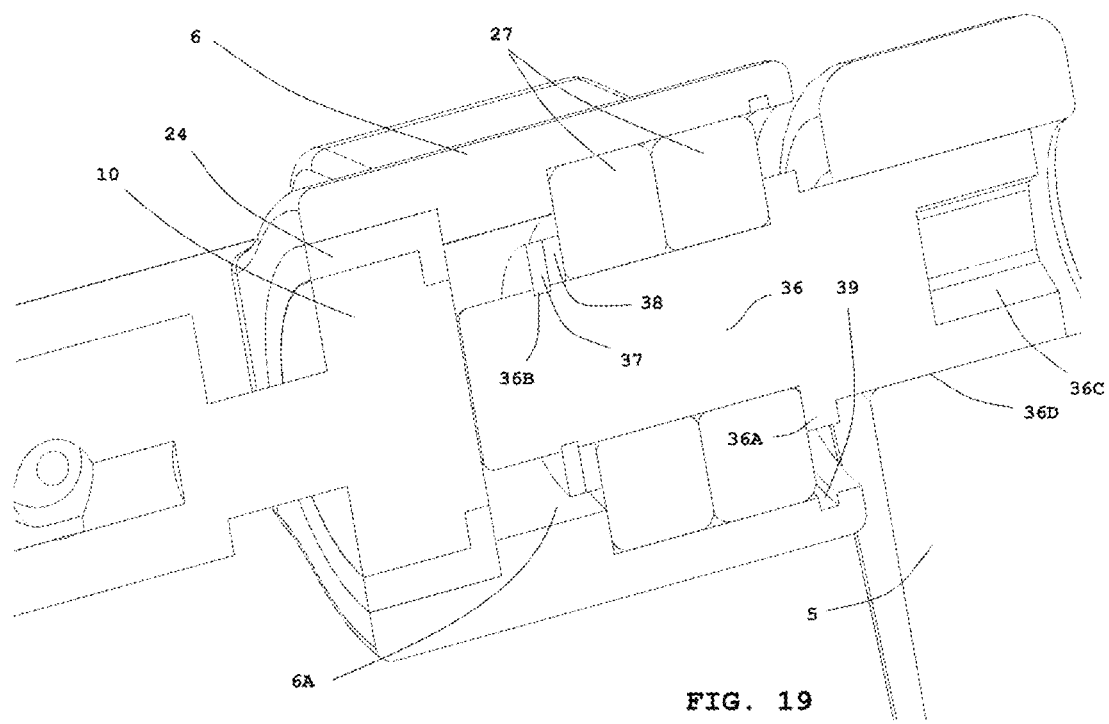
FIG. 19 Shown in cut away view is the bearing housing assembly.

FIG. 19 Shown in close-up cut away view, the bearing housing end cap 6 with bearings 27 which are secured on a bearing shaft 36 between a flange 36A and a retaining ring 37 which resides in a retainer groove 36B, a washer 38 resides between the bearing 27 and the retaining ring 37, the bearing shaft 36 is set into an internal compartment 6A and secured by a retaining ring that resides in a groove 39. Bearing shaft 36 releasably threads into the standard crank arm 5 via a threaded end 36D and tightened via a tool inserted into a receiving end 36C. Travel length bar 10 having its inwardly most end secured and rotatable in a bearing housing end cap bushing 24.

Figure 20:
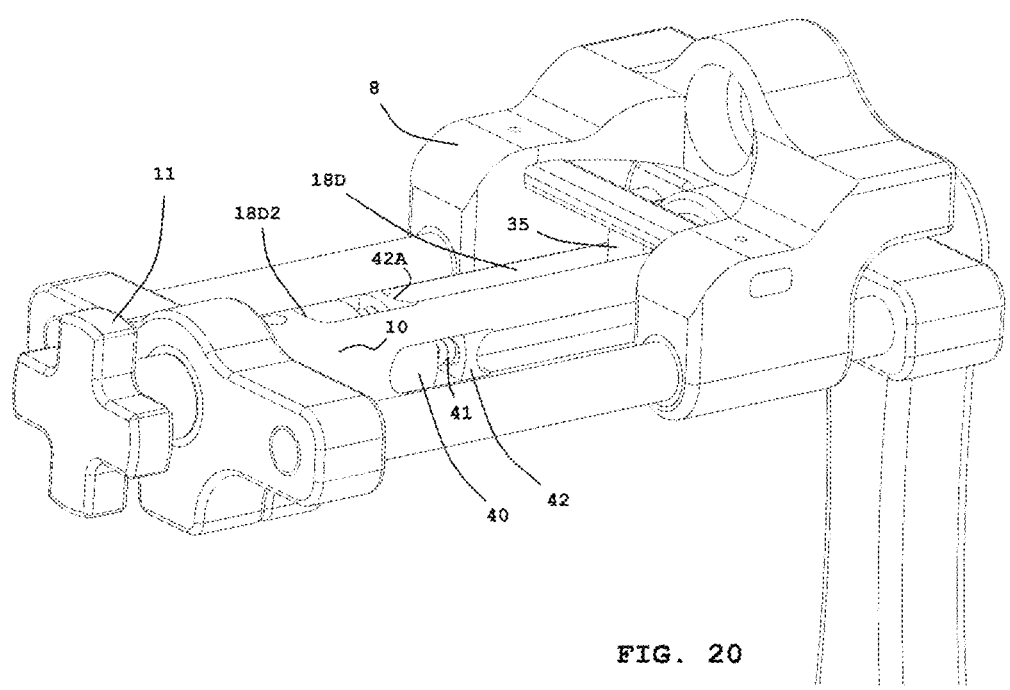
FIG. 20 Discloses a different embodiment of the current invention with a multiple spring cushioning system in place of the locking system.

FIG. 20 In another embodiment the current invention is shown with the travel length bar 10 having a spring system in each of the available travel length grooves, 18A, 18B, 18C, and 18D, this spring system absorbing the impact that exists when the user traverses the full length of the chosen travel length groove to the outwardly most position before traversing back to the most inwardly position. A spring base housing 40 sits against the end 18D2 of the travel length groove 18D, and houses a spring 41 which is attached at its free end to a post catch cup 42 which mirrors the shape of 18D2. When the pedal slider 8 is moved outwardly towards the post catch cup 42 the travel post 35 makes contact and the outward force is absorbed by the compressing of the spring 41 which also gives haptic feedback to the user to begin traversing in the opposite direction.

Figure 21:
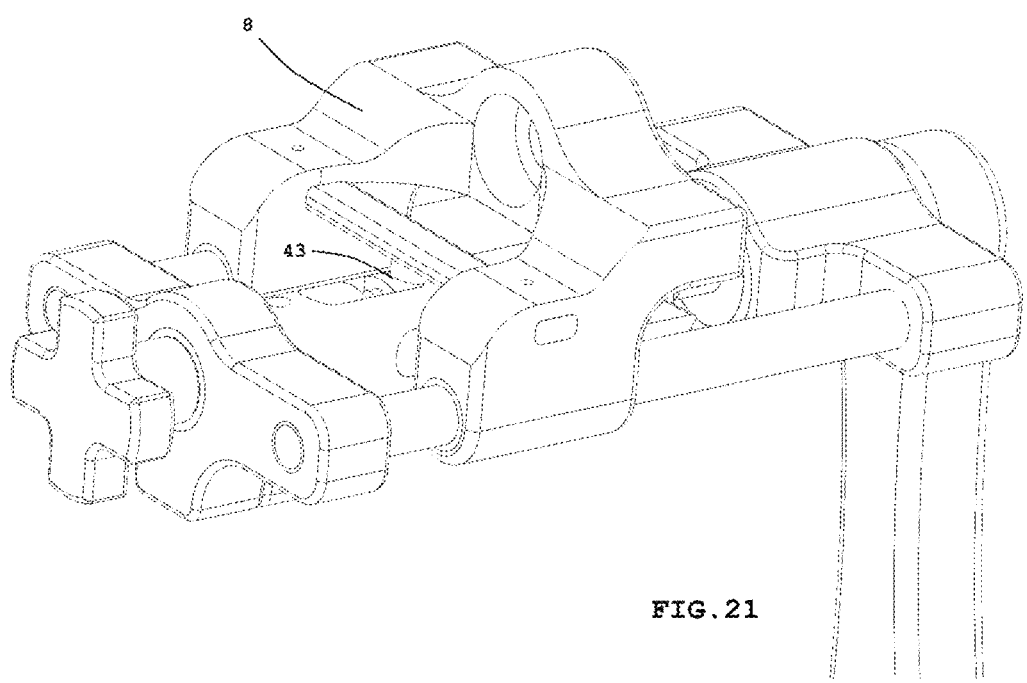
FIG. 21 Discloses the pedal slider at the furthest lateral outwardly movement afforded by the travel slot selected and stopped against the spring cushioning system.

FIG. 21 Showing the pedal slider 8 having traversed the travel length groove and contacting the spring catch cup at a contact point 43.

Figure 22:
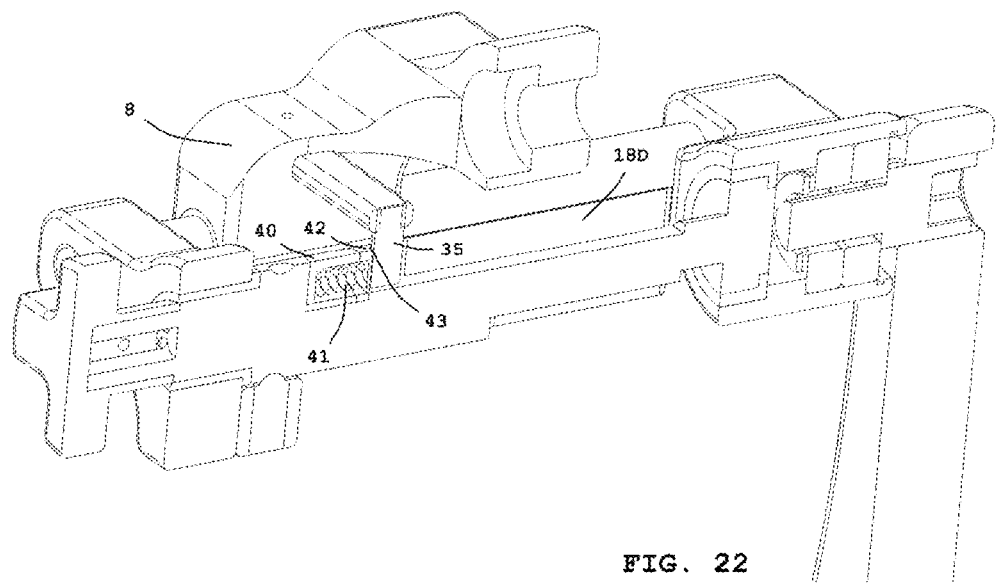
FIG. 22 Shown in cut away view the pedal slider at the furthest lateral outwardly movement afforded by the travel slot selected and stopped against the spring cushioning system.

FIG. 22 Shown in cut away view, the pedal slider 8 having utilized the full travel length of the travel length groove 18D and travel post 35 having contacted spring catch cup 42 at point 43 and compressing spring 41 inside spring housing 40 providing a smooth stopping point for the user and directing a change of direction.

Figure 23:
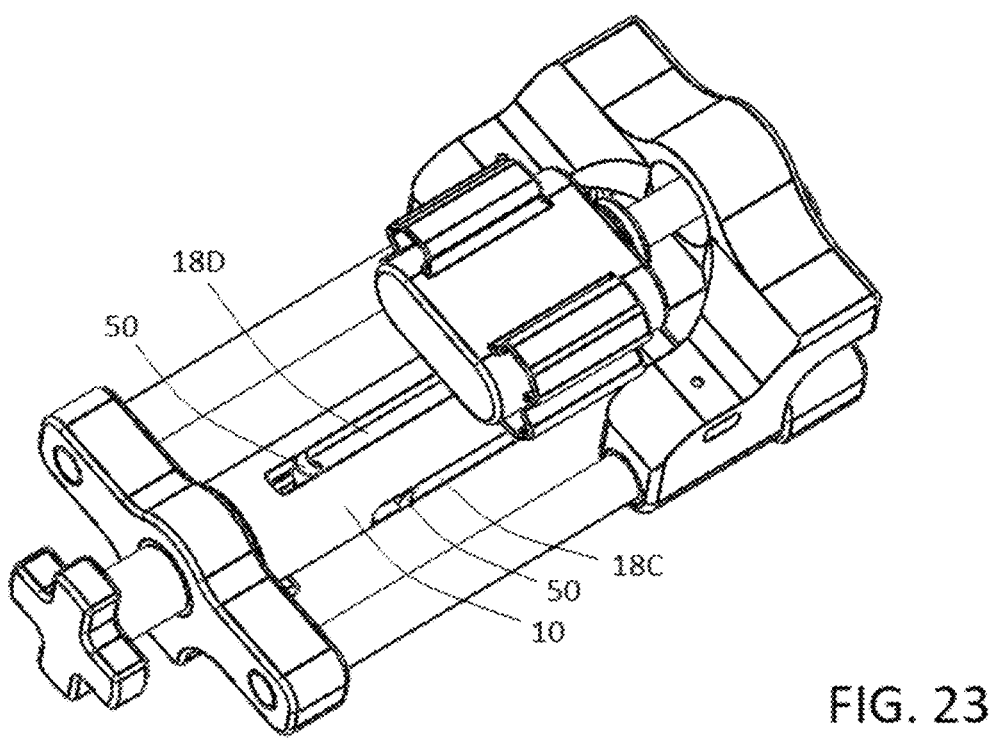
FIG. 23 Shown in ¾ top front view discloses another embodiment of the current invention specifically a single spring cushioning system in place of the multiple spring cushioning system.

FIG. 23 Shown in ¾ top front view, in another embodiment the current invention is shown with the travel length bar 10 having a single spring system activated by a plurality of engagement posts 50 located in each of the available travel length grooves 18D, 18A, 18B, 18C, this spring system absorbing the impact that exists when the user traverses the full length of the chosen travel groove to the outwardly most position before traversing back to the most inwardly position.

Figure 24:
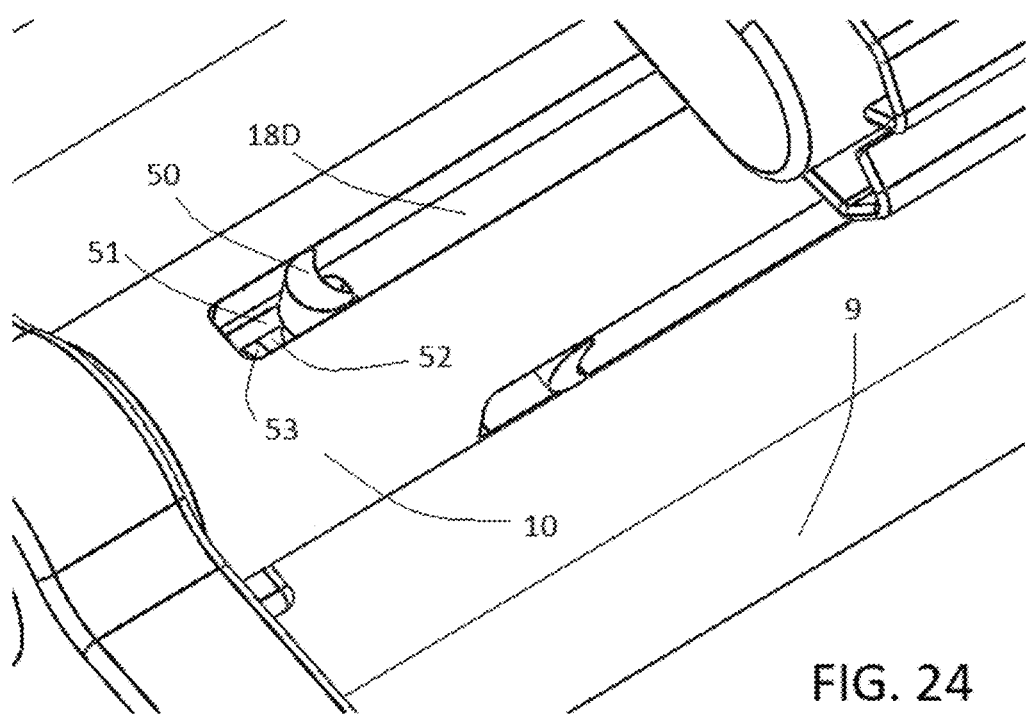
FIG. 24 Shown in ¾ top front view discloses a close up view of one of the single spring cushioning systems engagement post.

FIG. 24 Showing a close-up top view of the travel length bar 10, specifically groove 18D, an engagement post 50 positioned through an engagement post slot 51 and mounted into a spring shaft 52. A single spring 53 shown contacting the spring shaft 52.

Figure 25:
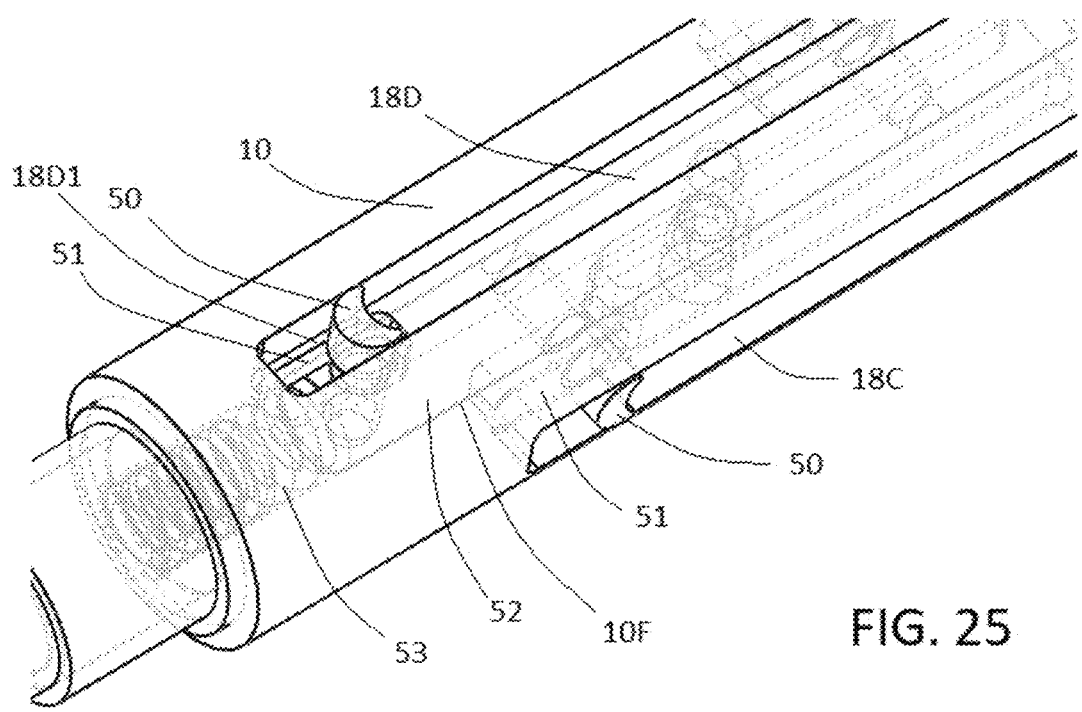
FIG. 25 Shown in transparent view disclosing the internal workings of the single spring cushioning system.

FIG. 25 Shown in transparent view is the travel length bar 10, travel length grooves 18D and 18C are numbered yet 18A and 18B are visible as the travel length grooves are located at each ¼ rotation of the travel length bar. In travel length groove 18D the floor of the groove is noted as 18D1. Spring shaft 52 rides in a center hole 10F of the travel length bar along with spring 53. Engagement post slot 51 allows the engagement post 50 to engage the spring shaft 52. Travel groove 18C also shows an engagement post 50 positioned through an engagement post slot 51 engaging the same spring shaft 52.

Figure 26:
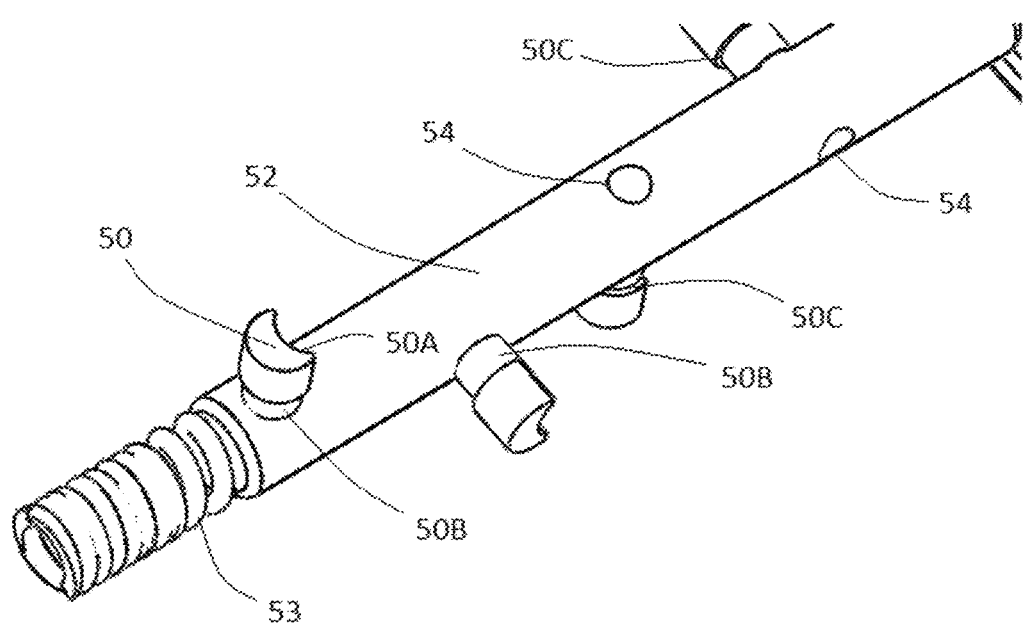
FIG. 26 Discloses the internal spring shaft, spring, and engagement posts of the single spring system.

FIG. 26 Details the components that reside inside the travel length bar 10 in this embodiment of the invention. The spring shaft 52 having a plurality of engagement post mounting holes 54 located at each quarter rotation of the spring shaft 52 with the engagement posts 50 mounted within holes 54. The engagement posts having a half round cut out 50A which allows for secure contact engagement with the cylindrical travel post 35. Further, the engagement post 50 has a portion above the spring shaft that is a smaller diameter 50B than upper portion, this smaller area fits snugly in the engagement post slot 51. A step area 50C that increases in diameter from 50B rests on the floor area 18D1 of travel length groove 18D, this configuration and interaction is repeated in travel length grooves 18A, 18B, and 18C. Regardless of which travel length groove 18A-18D the user utilizes, when the travel post 35 engages with the engagement post 50 of the chosen travel length groove, all four engagement posts move in their specific engagement post slots 51 as they are all mounted to the centrally located single spring shaft 52 and the spring shaft pushes against the centrally located single spring 53 which acts as a cushion. All four engagements posts 50 thus activate the single spring causing the same cushioning effect through any of the travel length grooves utilized by the rider.

Figure 27:
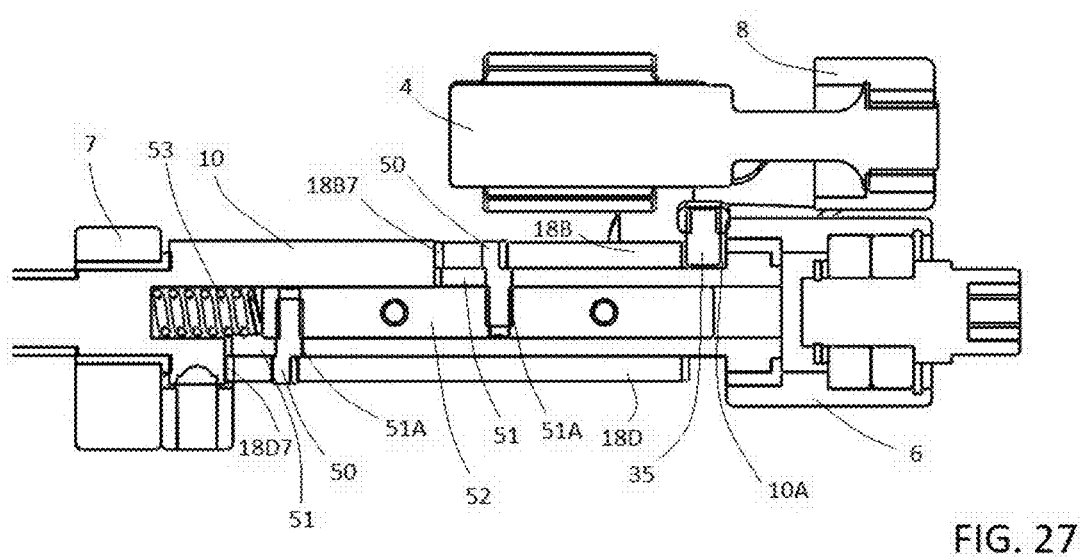
FIG. 27 Shown in cut away side view is the single spring cushioning system with the pedal being in the "neutral" position of its travel ability by the travel post.

FIG. 27 Shown in cut away side view, the pedal slider 8 is in the "neutral" position with the travel post 35 in the travel length bar open slot 10A. The spring 53 is in a "free" expanded state.

Figure 28:
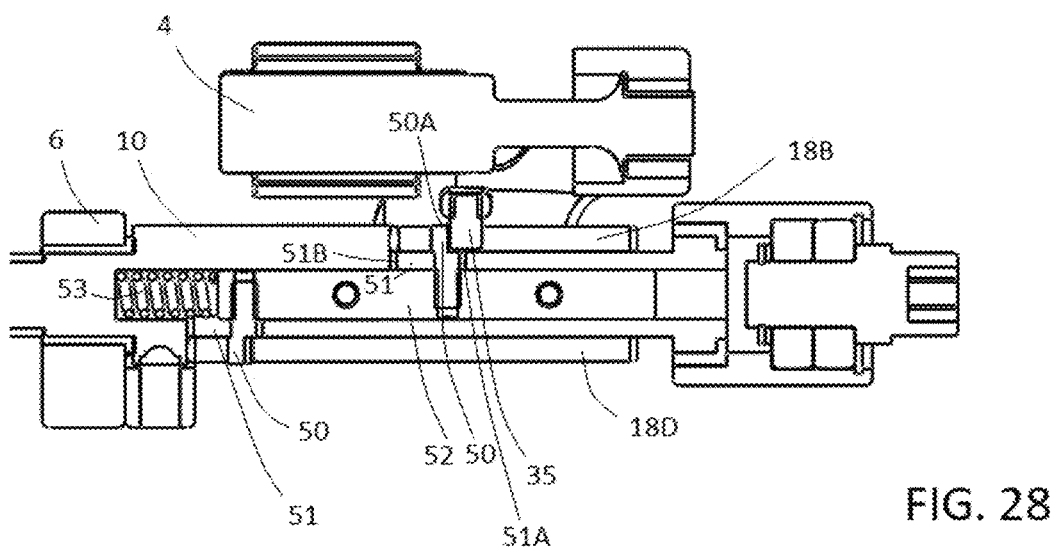
FIG. 28 Shown in cut away side view is the single spring cushioning system with the pedal being in a position of contact with the engagement post of the single spring cushion system via the travel post.

FIG. 28 Shown in cut away side view, the pedal slider 8 has traveled the length of the travel length groove 18B and the travel post 35 has contacted the engagement post 50 at the connection point 50A. The engagement post 50, which is connected to the spring shaft 52 is not as yet transferring "load" against the spring 53, spring 53 is still in a "free" expanded state.

Figure 29:
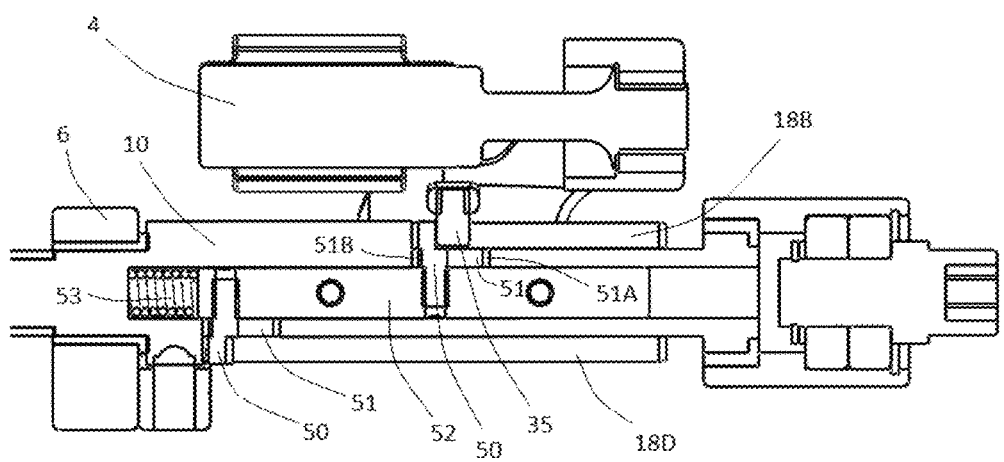
FIG. 29 Shown in cut away side view is the single spring cushioning system with the pedal having utilized the single spring cushioning system by the travel post contacting and moving the engagement post thus activating the cushioning system.

FIG. 29 Shown in cut away side view, the pedal slider 8 has traveled the length of the travel length groove 18B and the travel post 35 has contacted the engagement post 50 at the connection point 50A. The outwardly movement generated by the user is now cushioned by the engagement post 50 contacting and transferring "load" into the spring shaft 52 outwardly causing the spring 53 to compress causing a cushioning effect at the end of the travel stroke removing any jarring or pounding of the components and the user. The "push back motion" of the spring 53 expanding again as the rider changes direction in their movement offers the user assistance in traveling the opposite direction in the travel length groove selected, resulting in the spring 53 returning to a "free" state and the engagement post 50 returning to contact with the backside of the engagement slot 51A. With each rotation of the pedal 4 slider assembly 1 the pedal slider 8 travels outwardly across the selected travel length groove causing the spring engagement and cushioning effect to be activated.

Figure 30:
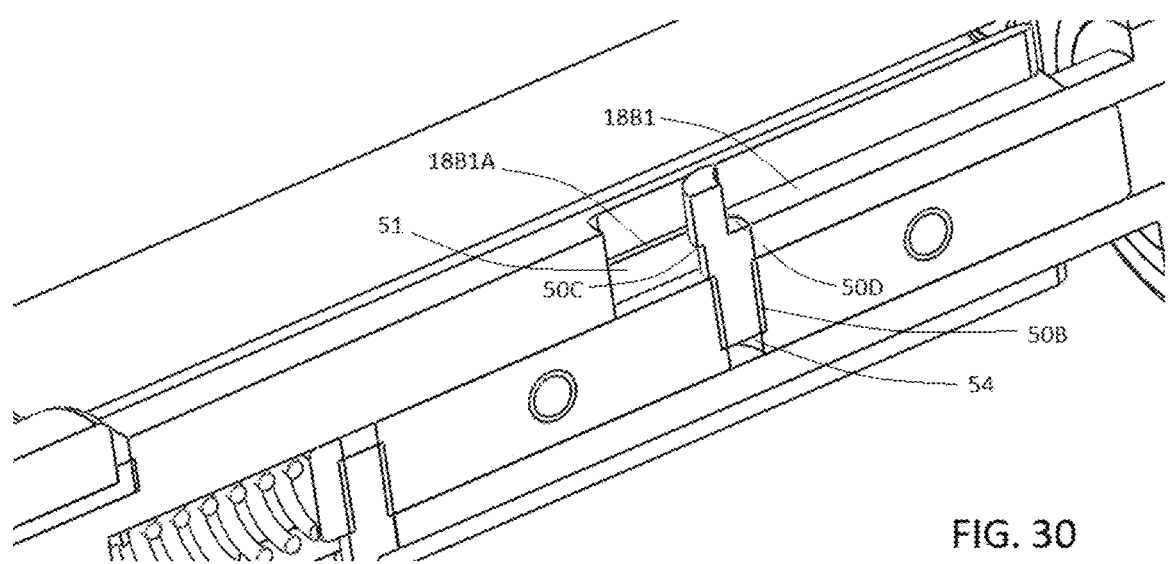
FIG. 30 Close up cut away of the engagement post in the through slot of the travel groove.

FIG. 30 Shows a close-up cut away of the travel length groove 18B, the floor of the travel groove 18B1, and an area of the floor 18B1A on either side of the engagement post 50. Engagement post 50 has a step-in floor 50D that is positioned at the same level of the floor of the travel length groove 18B1. The engagement post 50 has a threaded portion 50B for fastening to the spring shaft 52 while a reduced area 50C creates a ledge on the engagement post for fitment in the through slot 51. The "ledge" area of 50C produces a surface area that rides on top of the floor area 18B1A. A plurality of mounting holes 54 in the spring shaft 52 are also indicated.

Figure 31:
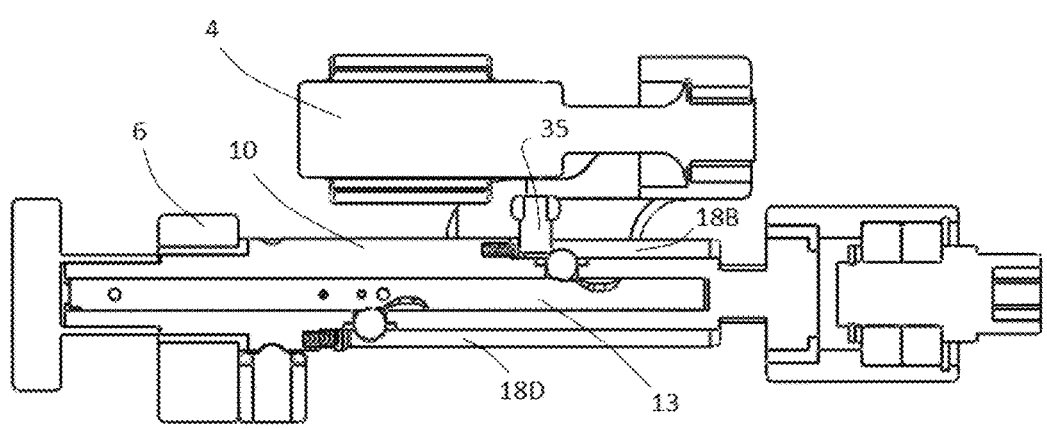
FIG. 31 Cut away side view of the pedal slider at the farthest outward position of a chosen travel length groove, locked in that outward spot and compressing the spring cushioning system.

FIG. 31 In another embodiment the current invention incorporating a locking system and a spring cushioning system is shown in cut away side view with the pedal slider travel post 35 at the outward most position of travel length groove 18B in the travel length bar 10 and locked in that position while compressing the spring cushioning system.

Figure 32:
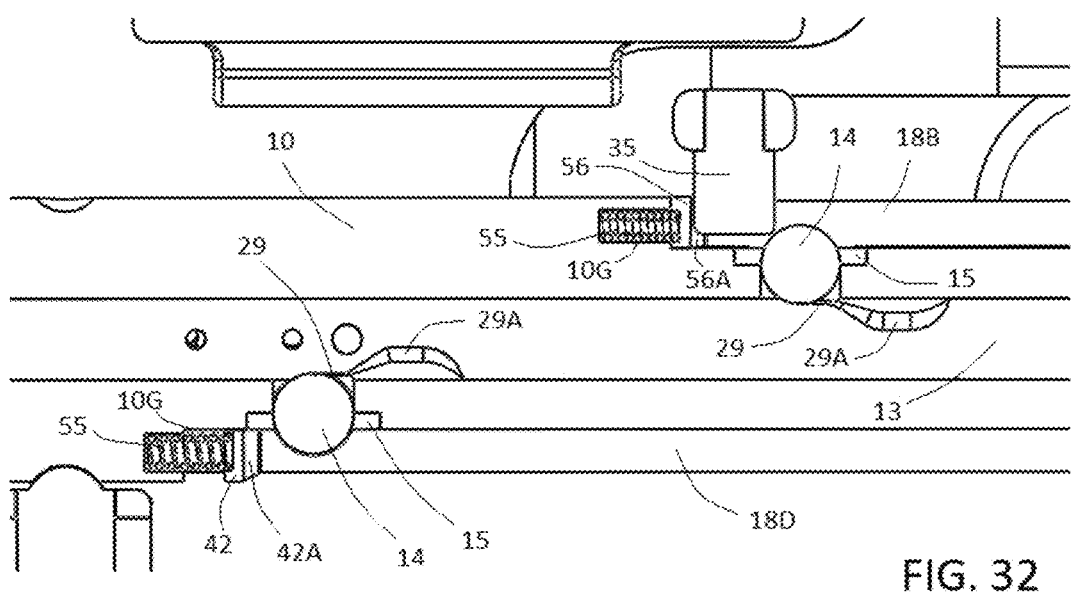
FIG. 32 Cut away close-up of FIG. 31, the locking system engaged, and the spring cushioning system compressed.

FIG. 32 Shows a cut away side view close-up detail of FIG. 31 the travel post 35 at the outward most end of travel length groove 18B and having contacted a indentation 56A in the spring cap 56 and compressed a spring 55 into a spring retention hole 10G, the lock ball 14 resides in the lock position 29 of the lock post shaft 13 and retained vertically by the lock ball retainer 15. A spring 55 located in the travel length groove 18D is shown in its expanded "free" state. A spring 55 located in the travel length groove 18B is shown in a compressed state as the travel post 35 has contacted the spring cap 56 causing the compression, this compression being held as the lock system is engaged with the lock ball 14 being elevated into the raised position by its connection with the lock position 29 of the lock shaft 13 which locks the travel post 35 and therefore the pedal slider assembly at the most outwardly position of the chosen travel length groove. All lock balls are moved into the locked position, or unlocked position at the same time when a positional change of the lock shaft 13 is initiated, regardless of which travel length groove is designated for use.

Figure 33:
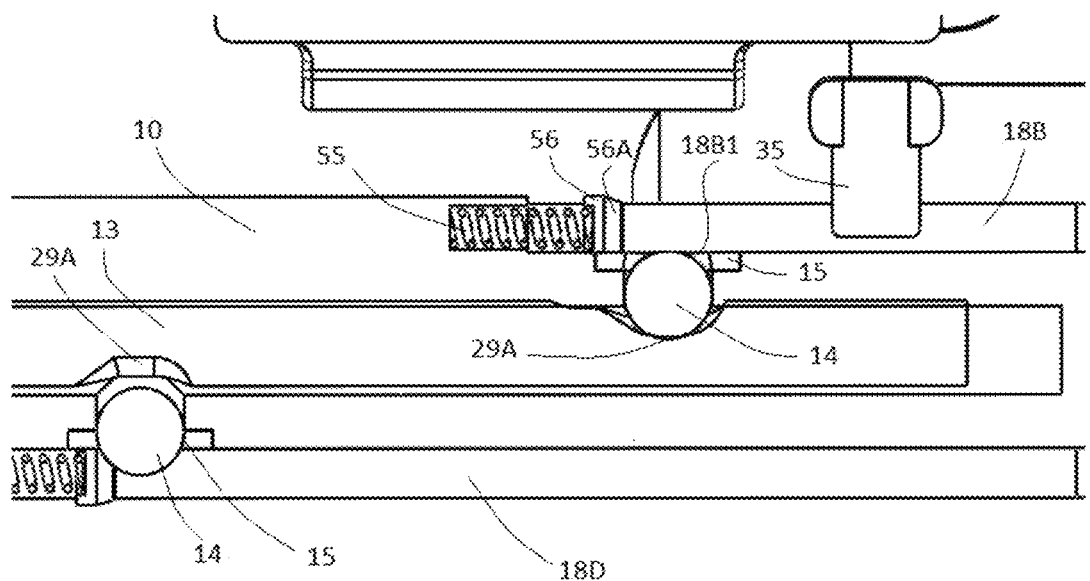
FIG. 33 Cut away close-up of the locking system disengaged and the spring cushioning system in its expanded state available to cushion the lateral movement of the pedal slider travel post.

FIG. 33 Shows a cut away side view close-up detail of the lock system in its unlocked position with the lock ball 14 sitting in the unlocked position 29A of the lock shaft 13, the lock ball 14 being completely below the floor 18B1 of the travel groove 18B allowing the travel post 35 to freely travel outwardly and inwardly in the shown travel groove 18B contacting the spring cushioning system near the outer most portion of the travel length groove, the travel post 35 contacting the spring cap 56 and in compressing the spring 55 slowing and cushioning the outwardly motion to restrict jarring contact for the user while giving energetic feedback for the inwardly motion to follow. The lock ball 14 of travel groove 18D due to gravity has fallen into the same position as when locked however when the travel length bar is rotated for travel groove 18D to be on top and in the accessed position that lock ball would fall due to gravity and contact the unlocked area 29A of the lock shaft.

Figure 34:
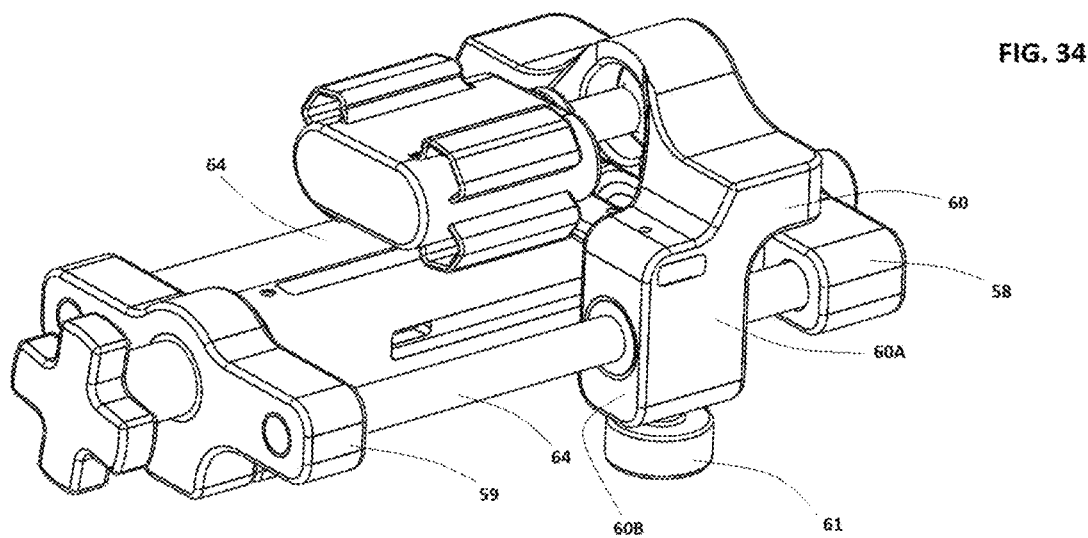
FIG. 34 Discloses a different embodiment of the current invention specifically with a tensioning mechanism from a front ¾ view angle.

FIG. 34 In another embodiment the current invention incorporating a tensioning mechanism shows the pedal slider assembly with the pedal slider 60 having a pair of legs 60A with one leg having an extended area 60B and having a tensioning screw 61 threaded therein that contacts the slider rod 64 creating drag on the bar and giving resistance feedback to the user as the pedal slider component is moved across the slider rods. The slider rods held between the bearing housing end cap 58 and the slider rod end cap 59.

Figure 35:
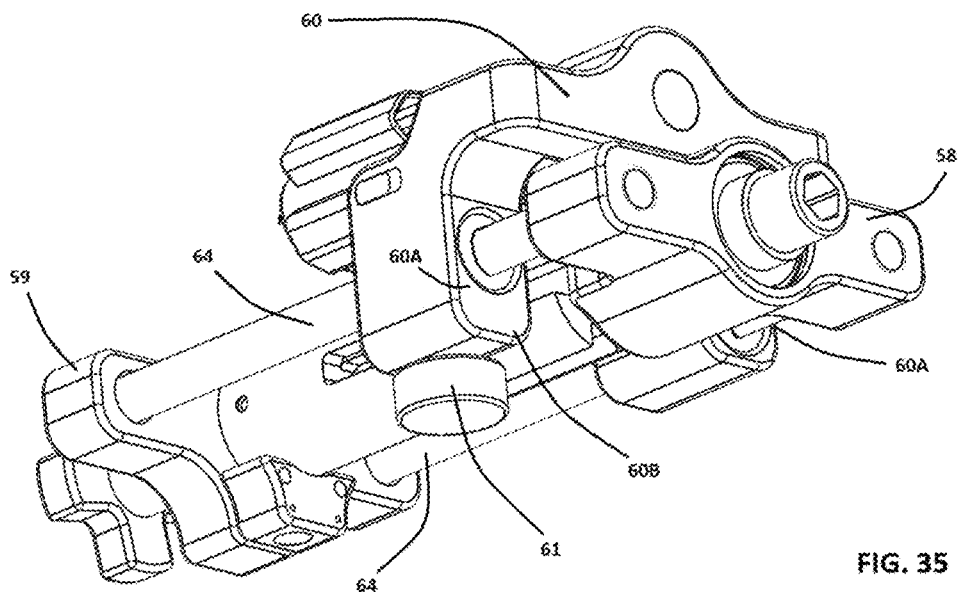
FIG. 35 Shown in ¾ rear underneath angle detailing the tensioning mechanism and tensioning screw.

FIG. 35 Showing for a lower rear view of the tensioning mechanism, the tensioning screw 61 threadable into the longer 60B of the two pedal slider component legs 60A.

Figure 36:
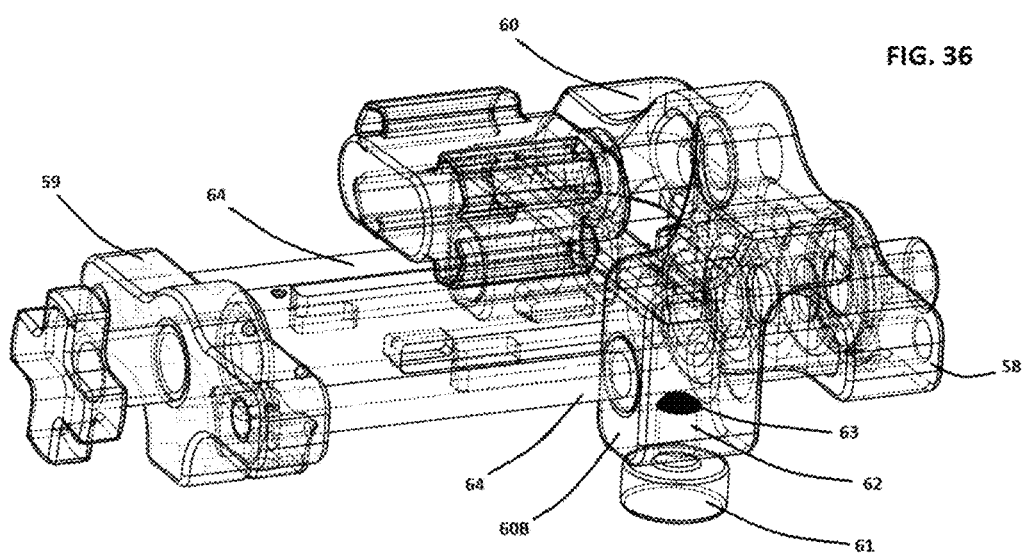
FIG. 36 Shown in transparent side/partial top view detaining the internals of the tensioning screw cushion against the slider rod.

FIG. 36 Shown in transparent view the tensioning screw 61 with threaded shaft 62 and nylon type material tip 63 which contacts slider rod 64 applying drag and slowing the pedal slider component's 60 movement across the slider rods 64, the tighter the tensioning screw 61 the more drag is applied and the slower the pedal slider component 60 will slide across the slider rods 64.

Figure 37:
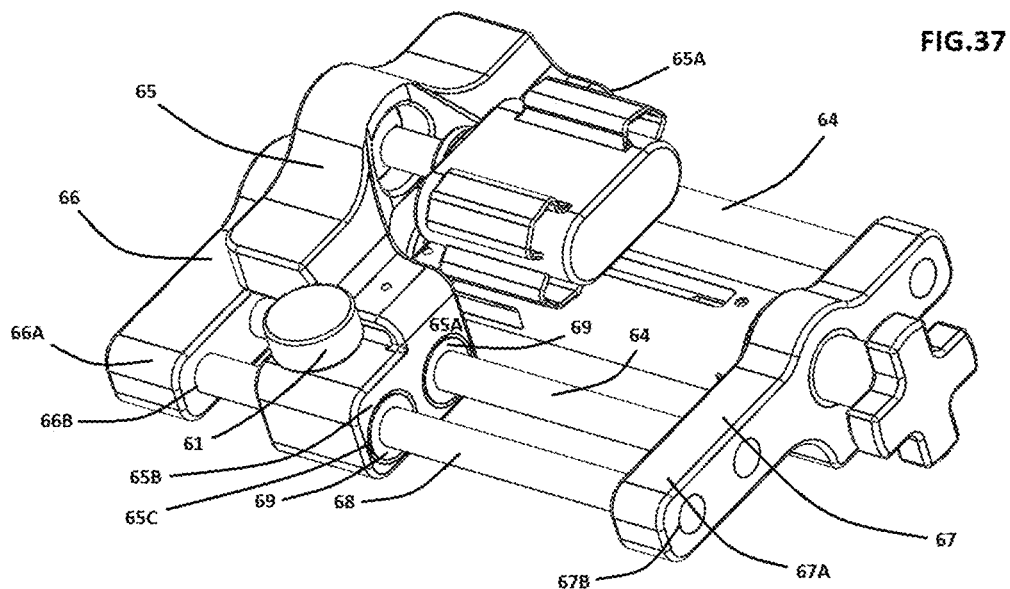
FIG. 37 Detailing another embodiment from top front side angle disclosing a tensioning mechanism.

FIG. 37 In yet another embodiment the current invention incorporating the tensioning mechanism shows the pedal slider assembly in which the pedal slider component 65 has one of the legs 65A widened 65B to accept a third slider rod 68 through the bearing mounting hole 65C and bearing 69. The slider rod end cap 67 having an extended area 67A and a mounting hole 67B for securing one end of the slider rod 68. Bearing housing end cap 66 having an extended area 66A and a mounting hole 66B for securing one end of the slider rod 68.

Figure 38:
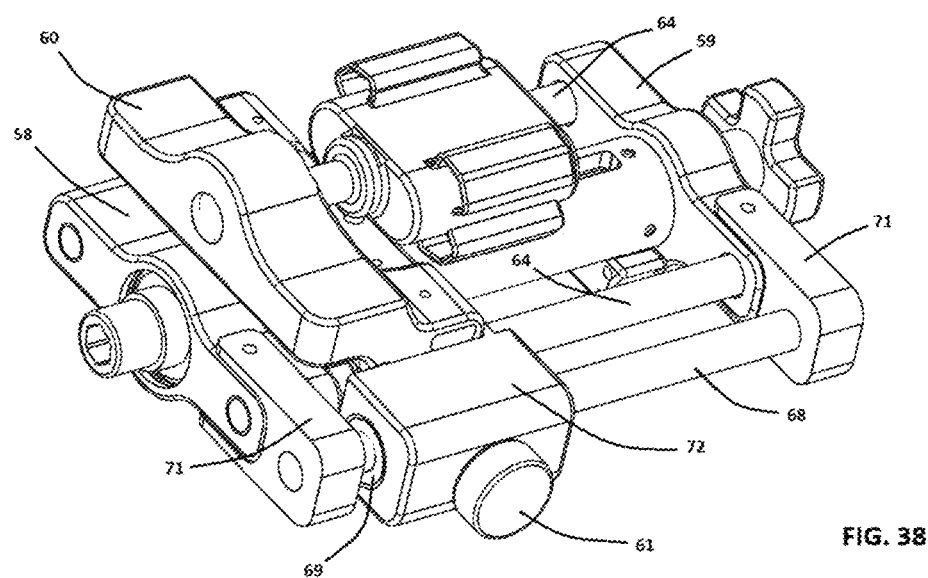
FIG. 38 Shown in ¾ top rear angle yet another embodiment disclosing a tensioning accessory to the current invention.

FIG. 38 Another embodiment of the current invention teaching a tensioning mechanism that affords similar features as functions as the previous embodiment in a bolt-on configuration to the first embodiment of the current invention. An extension bracket 71 is attached to the slider rod end cap 59 and another extension bracket 71 is attached to the bearing housing 58 by way of mounting holes 71A. Tensioning block 72 is mounted to the pedal slider 60 by way of mounting holes 72A (visible in FIG. 40) and contains bearing 69 and tensioning adjuster screw 61. Slider rod 68 passes through bearing 69 and tensioner screw 61 applies force against the slider rod 68 creating drag and slowing the sliding speed of the pedal slider component 60.

Figure 39:
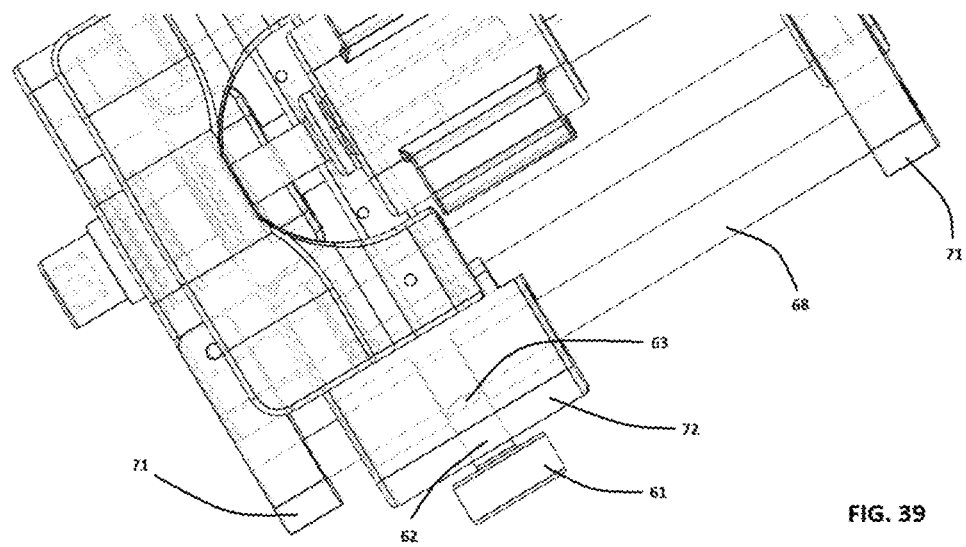
FIG. 39 Shown in top and transparent view the tensioning mechanism.

FIG. 39 Shown in top view and transparent disclosing the tensioner screw 61, the threaded portion 62, and the nylon type material contact pad 63 which contacts slider rod 68 creating friction and slowing the amount of fluidity in motion afforded the pedal slider 60.

Figure 40:
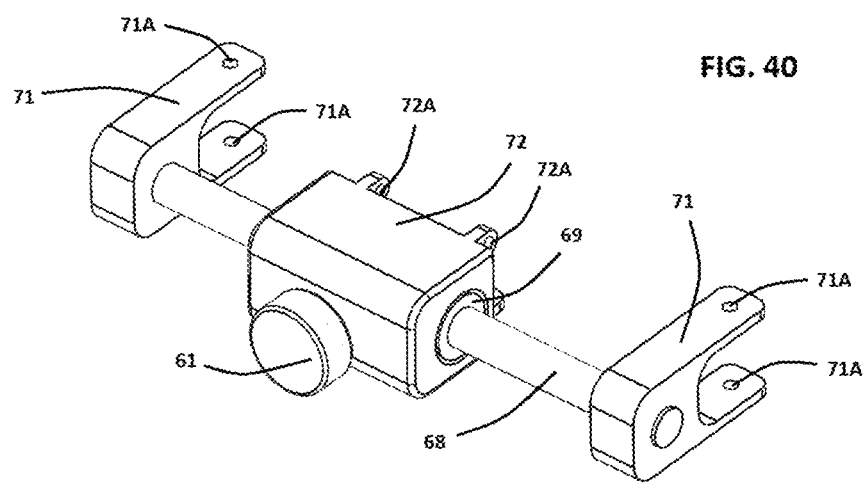
FIG. 40 Detailed in side top ¾ view the accessory tensioning mechanism.

FIG. 40 Shown in ¾ view, the components that configure the bolt on tensioning mechanism to the original embodiment of the current invention. Components fully detailed in FIG. 38 details above.

The invention claimed is:

1. A pedal slider assembly comprising: a rotatable structure wherein a bearing housing end cap secures a bearing mounted on an assembly mounting post, the bearing housing end cap securing a pair of slider rods, the pair of slider rods secured at one end in the bearing housing end cap and the other end by a slider end cap, the pair of slider rods supporting a pedal slider component having threads for a pedal, the assembly mounting post having threads for securing the pedal slider assembly to a bicycle crank arm, the pedal slider assembly allowing the pedal to traverse laterally outward away from and back towards a bicycle frame as the pedal travels through a circular pedal rotational path, the lateral movement having adjustable frictional resistance by way of a tensioning device.

2. A pedal slider assembly as claimed in claim 1, wherein the tensioning device is mounted within an external wall of at least one of respective vertical portions of the pedal slider component where the pair of slider rods respectively pass through the pedal slider component, the tensioning device further comprising a releasably secured fastener with a nylon tip wherein the nylon tip contacts one of the pair of slider rods creating the frictional resistance against the lateral movement of the pedal slider component, the amount of frictional resistance adjustable by adjusting the fastener.

3. A pedal slider assembly as claimed in claim 1, wherein the tensioning device is mounted to each of at least one side of the bearing housing end cap and to at least one side of the slider rod end cap by way of a respective end cap extension bracket, the tensioning device further comprising a tensioner block through which a third slider rod extends, the third slider rod supported by the respective end cap extension brackets, the third slider rod passing through a bearing mounted within the tensioner block, the tensioning device further comprising an adjustable releasably secured fastener with a nylon tip mounted within the tensioner block that contacts the third slider rod creating the adjustable frictional resistance against the lateral movement of the pedal slider component, the amount of frictional resistance adjustable via the fastener.

4. A pedal slider assembly comprising: a rotatable structure wherein a bearing housing end cap secures a bearing mounted on an assembly mounting post, the bearing housing end cap securing a set of three slider rods, two of the three slider rods contained in one vertical portion of the pedal slider component and the other slider rod of the three slider rods contained in another vertical portion of the pedal slider component, the three slider rods secured at one end in the bearing housing end cap and the other end by a slider end cap, the three slider rods supporting a pedal slider component having threads for a pedal, the assembly mounting post having threads for securing the pedal slider assembly to a bicycle crank arm, the pedal slider assembly allowing the pedal to traverse laterally outward away from and back towards a bicycle frame as the pedal travels through a circular pedal rotational path; a tensioning device mounted within the one vertical portion of the pedal slider component which accommodates two of the three slider rods, a releasably secured fastener with a nylon tip contacts one of the two slider rods mounted in the vertical portion of the pedal slider component that houses two of the slider rods which creates resistance to the lateral movement of the pedal slider component, the amount of resistance adjustable by adjusting the fastener.

* * * * *